United States Patent
Shreevastav et al.

(10) Patent No.: US 12,041,465 B2
(45) Date of Patent: Jul. 16, 2024

(54) POSITIONING SIGNAL SEARCH WINDOW CONFIGURATION IN A WIRELESS COMMUNICATION SYSTEM

(71) Applicant: Telefonaktiebolaget LM Ericsson (publ), Stockholm (SE)

(72) Inventors: Ritesh Shreevastav, Upplands Väsby (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/624,142

(22) PCT Filed: Jul. 6, 2020

(86) PCT No.: PCT/SE2020/050711
§ 371 (c)(1),
(2) Date: Dec. 30, 2021

(87) PCT Pub. No.: WO2021/006803
PCT Pub. Date: Jan. 14, 2021

(65) Prior Publication Data
US 2022/0353696 A1    Nov. 3, 2022

Related U.S. Application Data

(60) Provisional application No. 62/870,985, filed on Jul. 5, 2019.

(51) Int. Cl.
*H04W 16/28* (2009.01)
*G01S 5/00* (2006.01)
(Continued)

(52) U.S. Cl.
CPC ........... *H04W 16/28* (2013.01); *G01S 5/0036* (2013.01); *G01S 5/0236* (2013.01); *H04B 7/0617* (2013.01)

(58) Field of Classification Search
CPC ..... H04B 7/0617; G01S 1/042; G01S 5/0036; G01S 5/0236; G01S 5/06; G01S 5/10; H04W 16/28; H04W 64/00
(Continued)

(56) References Cited

U.S. PATENT DOCUMENTS

| 2006/0103575 A1 | 5/2006 | Moeglein et al. |
| 2011/0205122 A1 | 8/2011 | Siomina et al. |

(Continued)

FOREIGN PATENT DOCUMENTS

| EP | 3256872 B1 | 8/2019 |
| WO | 2020119925 A1 | 6/2020 |

OTHER PUBLICATIONS

Qualcomm Incorporated, "Summary of 7.2.10.3: PHY procedures for positioning measurements", 3GPP TSG-RAN WG1 Meeting #96bis, R1-1905658, Xi'an, China, Apr. 8-12, 2019, 1-10.
(Continued)

*Primary Examiner* — Robert J Lopata
(74) *Attorney, Agent, or Firm* — Murphy, Bilak & Homiller, PLLC

(57) ABSTRACT

A network node (18) transmits, to a wireless device (12), assistance data (20) that indicates a search window (26) which is associated with a beamforming configuration. The search window (26) associated with the beamforming configuration may be a window within which a result (28) of a positioning measurement performed by the wireless device (12) on a positioning signal (20A) is expected to be for the associated beamforming configuration. The wireless device (12) may check whether a result (28) of the performed positioning measurement falls within the indicated search window (26), and deem the result (28) valid or invalid
(Continued)

depending respectively on whether or not the result (28) falls within the indicated search window (26) according to that checking.

20 Claims, 25 Drawing Sheets

(51) Int. Cl.
 *G01S 5/02* (2010.01)
 *H04B 7/06* (2006.01)
(58) Field of Classification Search
 USPC .......................................................... 370/329
 See application file for complete search history.

(56) References Cited

U.S. PATENT DOCUMENTS

| | | | | |
|---|---|---|---|---|
| 2015/0245234 | A1* | 8/2015 | Roy | H04W 72/0453 |
| | | | | 370/252 |
| 2017/0047976 | A1* | 2/2017 | Noh | H04B 7/0695 |
| 2019/0158162 | A1 | 5/2019 | Ryu et al. | |
| 2020/0107209 | A1* | 4/2020 | Ratasuk | G01S 5/0236 |
| 2020/0228381 | A1* | 7/2020 | Manolakos | H04W 64/00 |
| 2020/0275236 | A1* | 8/2020 | Gangakhedkar | H04W 4/025 |
| 2020/0322037 | A1* | 10/2020 | Abedini | H04W 24/10 |
| 2020/0344712 | A1* | 10/2020 | Akkarakaran | H04L 5/0051 |
| 2021/0373118 | A1* | 12/2021 | Bao | H04B 7/0802 |
| 2021/0400754 | A1* | 12/2021 | Bhojkumar | H04W 76/16 |
| 2022/0141795 | A1* | 5/2022 | Ku | H04W 64/006 |
| | | | | 455/456.6 |
| 2022/0174620 | A1* | 6/2022 | Cha | H04L 5/0023 |
| 2022/0209927 | A1* | 6/2022 | Shreevastav | H04L 5/0096 |

OTHER PUBLICATIONS

3GPP, "3GPP TS 29.172 V15.0.0", 3GPP; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); (Release 15), Jun. 2018, 1-43.

3GPP, "3GPP TS 36.355 V15.4.0", 3rd Generation Partnership Project; Technical Specification Group Radio Access Network; Evolved Universal Terrestrial Radio Access (E-UTRA); LTE Positioning Protocol (LPP) (Release 15), Jun. 2019, 1-224.

3GPP, "3GPP TS 38.211 V15.6.0", 3rd Generation Partnership Project; Technical Specification Group Radio Access Network; NR; Physical channels and modulation (Release 15), Jun. 2019, 1-97.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 1-960.

3GPP, "3GPP TS 29.171 V15.2.0", 3GPP; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 15), Mar. 2019, 1-62.

3GPP, "3GPP TS 36.455 V15.2.0", 3rd Generation Partnership Project; Technical Specification Group Radio Access Network; Evolved Universal Terrestrial Radio Access (E-UTRA); LTE Positioning Protocol A (LPPa) (Release 15), Dec. 2018, 1-83.

Zte, et al., "NR DL-TDOA positioning", 3GPP TSG RAN WG2 Meeting #107, R2-1909225, Prague, Czech, Aug. 26-30, 2019, 1-6.

Zte, et al., "NR DL-TDOA positioning procedure", 3GPP TSG RAN WG3 Meeting #103 bis, R3-191972, Xi'an, China, Apr. 8-12, 2019, 1-5.

* cited by examiner

TRANSMITTING, FROM THE NETWORK NODE TO A WIRELESS DEVICE, ASSISTANCE DATA THAT INDICATES DIFFERENT SEARCH WINDOWS WITHIN WHICH A RESULT OF A POSITIONING MEASUREMENT PERFORMED BY THE WIRELESS DEVICE ON ONE OR MORE SIGNALS IS EXPECTED TO BE FOR DIFFERENT RESPECTIVE BEAMFORMING CONFIGURATIONS USABLE TO TRANSMIT THOSE ONE OR MORE SIGNALS
600

RECEIVING, FROM THE WIRELESS DEVICE, A RESULT OF THE POSITIONING MEASUREMENT AS PERFORMED USING THE ASSISTANCE DATA
610

PERFORMING ONE OR MORE OPERATIONAL TASKS USING THE RESULT OF THE POSITIONING MEASUREMENT
620

*FIGURE 6*

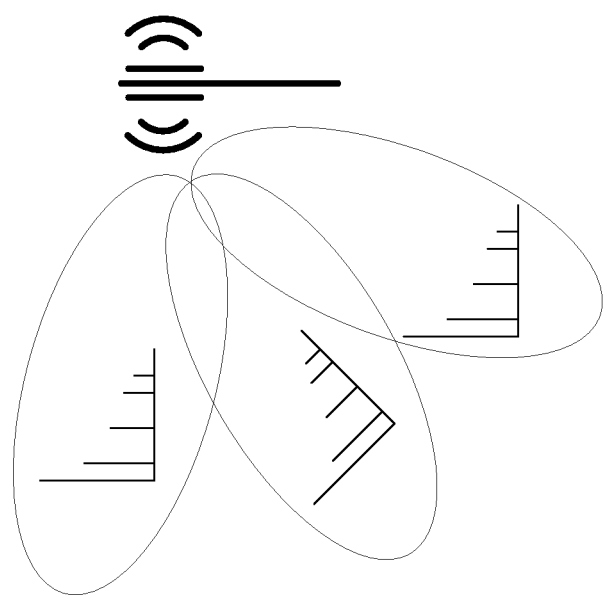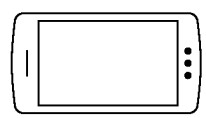
FIGURE 12

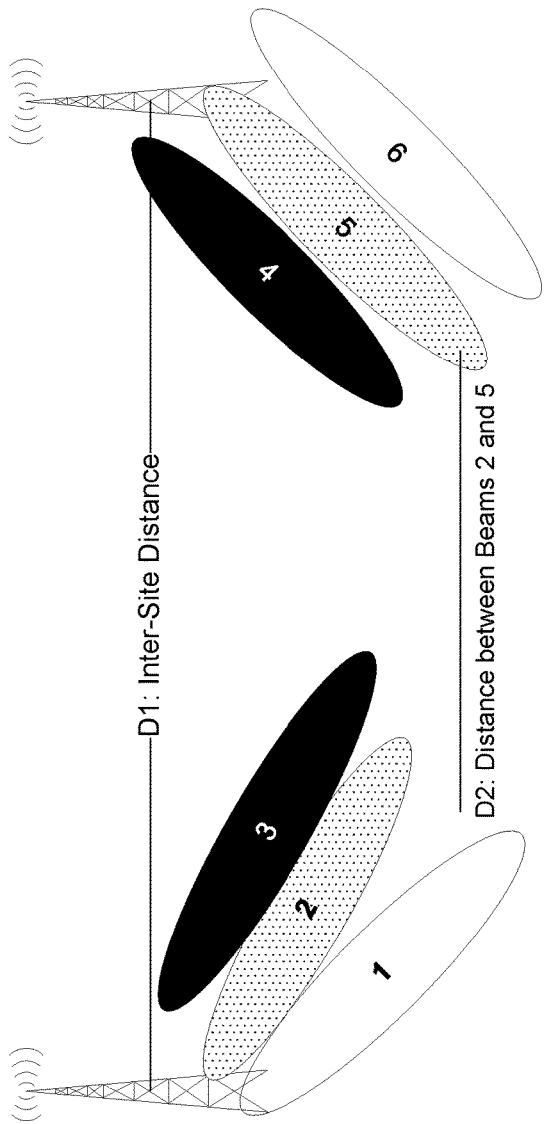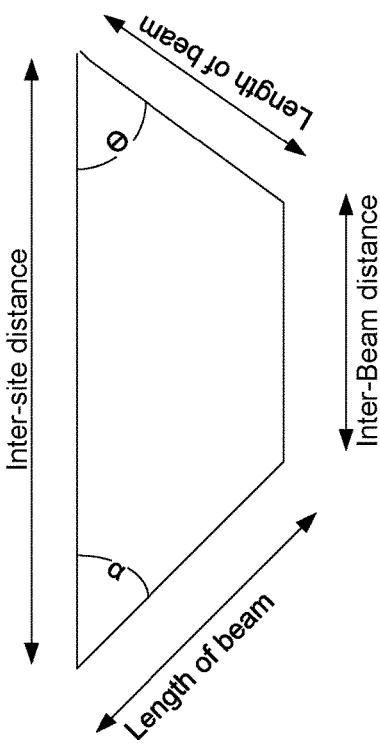
FIGURE 16

POSITIONING SIGNAL SEARCH WINDOW CONFIGURATION IN A WIRELESS COMMUNICATION SYSTEM

TECHNICAL FIELD

The present application relates generally to a wireless communication system, and relates more particularly to positioning signal search window configuration in such a system.

BACKGROUND

A wireless device performs a positioning measurement (e.g., observed time difference of arrival measurement) on one or more signals. Especially where the signal(s) are in higher frequency spectrum, the positioning measurement may be susceptible to errors due to aliasing, sidelobes, and other sources of error. To guard against this error, a so-called search window may be configured for specifying the range of positioning measurement results that are possible under the wireless device's current circumstances. For example, the search window for a fine-grained positioning measurement result may be defined based on coarse knowledge of the wireless device's positioning. In these and other cases, then, the wireless device may deem the result of the positioning measurement valid only if the result falls within the search window.

SUMMARY

Some embodiments herein configure a search window for a positioning measurement to be performed on one or more signals. Some embodiments in this regard notably configure the search window based on one or more beamforming configurations with which the one or more signals are transmitted. Some embodiments may for instance tailor the search window for the beamforming configuration(s), based on the understanding that different search windows may be optimal for different respective beamforming configuration(s). In these and other cases, then, some embodiments improve positioning accuracy and/or reduce processing demands required for positioning.

More particularly, embodiments herein include a method performed by a network node. The method comprises transmitting, from the network node to a wireless device, assistance data that indicates a search window which is associated with a beamforming configuration. In some embodiments, the search window associated with the beamforming configuration is a window within which a result of a positioning measurement performed by the wireless device on a positioning signal is expected to be for the associated beamforming configuration.

In some embodiments, the beamforming configuration is usable to transmit the positioning signal. In one such embodiment, the beamforming configuration may include at least one of any one or more of: a number of beams, if any, usable to transmit the positioning signal; a width of a beam usable to transmit the positioning signal; an elevation, tilt, orientation, and/or direction of the beam; a coverage area, footprint, and/or size of the beam; a shape of the coverage area, footprint, and/or size; an intra-beam distance of the beam; an inter-beam distance between the beam and another beam usable to transmit another positioning signal on which the positioning measurement is to be performed; neighbor beam information; a transmit power level associated with the beam; a beam-configuration dependent measurement range associated with the beam; and a type of a signal or channel characterizing the beam.

In some embodiments, for example, the positioning measurement is to be performed on only the positioning signal. In this case, the beamforming configuration associated with the search window may be the beamforming configuration usable to transmit positioning signal.

In other embodiments, though, the positioning signal is first positioning signal, and the positioning measurement is to be performed on both the first positioning signal and a second positioning signal, e.g., as transmitted by the same radio network node or different radio network nodes. In one such embodiment, for instance, the second positioning signal is to be used as a reference for the positioning measurement, e.g., as a reference link. Regardless, the beamforming configuration associated with the search window in this case may be a first beamforming configuration usable to transmit the first positioning signal or a second beamforming configuration usable to transmit the second positioning signal. In these and other embodiments, for instance, the positioning measurement may be a Observed Time Difference of Arrival, TDOA, measurement or a Reference Signal Time Difference, RSTD, measurement.

In either case, the search window may be associated with the beamforming configuration via a beam identifier, a synchronization signal block (SSB) identifier, a transmission configuration indicator (TCI), or quasi-colocation (QCL) characteristics with respect to a signal, channel, or control resource set, where that signal, channel, or control resource set is associated with a beam, positioning reference signal set or resource that is beam-specific.

In some embodiments, the method also comprises determining the search window to be associated with the beamforming configuration for the positioning measurement, based on that beamforming configuration. For example, in some embodiments, determining of the search window includes determining the search window to be associated with the beamforming configuration based on beam information associated with a beam used to transmit the positioning signal. The beam information associated with a beam may for instance comprises one or more of: an identifier of the beam; an identifier of a synchronization signal block transmitted on the beam; a quasi-colocation characteristic with respect to a signal, channel, or control resource set associated with the beam; a positioning signal resource set; or a resource specific to the beam.

Alternatively or additionally, determining of the search window may include determining the search window to be a first search window or a second search window, depending respectively on whether, according to the beamforming configuration, beamforming is or is not used to transmit the positioning signal or depending respectively on whether, according to the beamforming configuration, a number of beams used to transmit the positioning signal is or is not below a threshold.

In other embodiments, determining of the search window may include determining the search window to be a first search window or a second search window, depending respectively on whether according to the beamforming configuration, a width of one or more beams used to transmit the positioning signal is or is not below a threshold. Or, depending respectively on whether the positioning signal is transmitted in a first or a second frequency range, where the second frequency range is higher than the first frequency range.

Alternatively or additionally, determining of the search window may include determining the search window to be a first search window or a second search window that is narrower than the first search window, depending respectively on whether, according to the beamforming configuration, a maximum inter-beam distance between a beam used to transmit the positioning signal and a beam used to transmit another positioning signal on which the positioning measurement is performed is or is not above a threshold. Or, depending respectively on whether, according to the beamforming configuration, coverage areas of a beam used to transmit the positioning signal and a beam used to transmit another positioning signal on which the positioning measurement is performed are or are not farther away than a threshold.

No matter how the search window is determined, though, the method in some embodiments also comprises receiving, from the wireless device, a result of the positioning measurement as performed using the assistance data. In one such embodiment, the method may correspondingly include performing one or more operational tasks using the result of the positioning. In these and other embodiments, for instance, the method may comprise determining a position of the wireless device, based on the result of the positioning measurement.

Embodiments herein also include a method performed by a wireless device. The method includes receiving, from a network node, assistance data that indicates a search window which is associated with a beamforming configuration. In some embodiments, the search window associated with the beamforming configuration is a window within which a result of a positioning measurement performed by the wireless device on a positioning signal is expected to be for the associated beamforming configuration.

In some embodiments, the beamforming configuration is usable to transmit the positioning signal. In one such embodiment, the beamforming configuration includes at least one of any one or more of: a number of beams, if any, usable to transmit the positioning signal; a width of a beam usable to transmit the positioning signal; an elevation, tilt, orientation, and/or direction of the beam; a coverage area, footprint, and/or size of the beam; a shape of the coverage area, footprint, and/or size; an intra-beam distance of the beam; an inter-beam distance between the beam and another beam usable to transmit another positioning signal on which the positioning measurement is to be performed; neighbor beam information; a transmit power level associated with the beam; a beam-configuration dependent measurement range associated with the beam; and a type of a signal or channel characterizing the beam.

In some embodiments, for example, the positioning measurement is to be performed on only the positioning signal. In this case, the beamforming configuration associated with the search window may be the beamforming configuration usable to transmit positioning signal.

In other embodiments, though, the positioning signal is first positioning signal, and the positioning measurement is to be performed on both the first positioning signal and a second positioning signal, e.g., as transmitted by the same radio network node or different radio network nodes. In one such embodiment, for instance, the second positioning signal is to be used as a reference for the positioning measurement, e.g., as a reference link. Regardless, the beamforming configuration associated with the search window in this case may be a first beamforming configuration usable to transmit the first positioning signal or a second beamforming configuration usable to transmit the second positioning signal. In these and other embodiments, for instance, the positioning measurement may be a Observed Time Difference of Arrival, TDOA, measurement or a Reference Signal Time Difference, RSTD, measurement.

In either case, the search window may be associated with the beamforming configuration via a beam identifier, a synchronization signal block (SSB) identifier, a transmission configuration indicator (TCI), or quasi-colocation (QCL) characteristics with respect to a signal, channel, or control resource set, where that signal, channel, or control resource set is associated with a beam, positioning reference signal set or resource that is beam-specific.

The method in some embodiments also comprises performing the positioning measurement using the assistance data. In one such embodiment, the method may correspondingly include performing one or more positioning tasks using the result of the positioning measurement. In these and other embodiments, for instance, the method may comprise checking whether a result of the performed positioning measurement falls within the indicated search window, and deeming the result of the positioning measurement valid or invalid depending respectively on whether or not the result falls within the indicated search window according to that checking. Alternatively or additionally, the method may comprise reporting a result of the positioning measurement, and/or determining a position of the wireless device, based on the result of the positioning measurement.

Embodiments herein also include corresponding apparatus, computer programs, and carriers of those computer programs. For example, embodiments herein include a network node, e.g., comprising communication circuitry and processing circuitry. The network node is configured to transmit, from the network node to a wireless device, assistance data that indicates a search window which is associated with a beamforming configuration. In some embodiments, the search window associated with the beamforming configuration is a window within which a result of a positioning measurement performed by the wireless device on a positioning signal is expected to be for the associated beamforming configuration.

Embodiments herein also include a wireless device, e.g., comprising communication circuitry and processing circuitry. The wireless device is configured to receive, from a network node, assistance data that indicates a search window which is associated with a beamforming configuration. In some embodiments, the search window associated with the beamforming configuration is a window within which a result of a positioning measurement performed by the wireless device on a positioning signal is expected to be for the associated beamforming configuration.

BRIEF DESCRIPTION OF THE DRAWINGS

FIG. 6 is a logic flow diagram of a method performed by a network node according to other embodiments.

FIG. 12 is a block diagram of a user equipment receiving multiple beams from a transmission point according to some embodiments.

FIG. 16 is a block diagram illustration inter-beam distance computation according to some embodiments.

DETAILED DESCRIPTION

Figure 1:
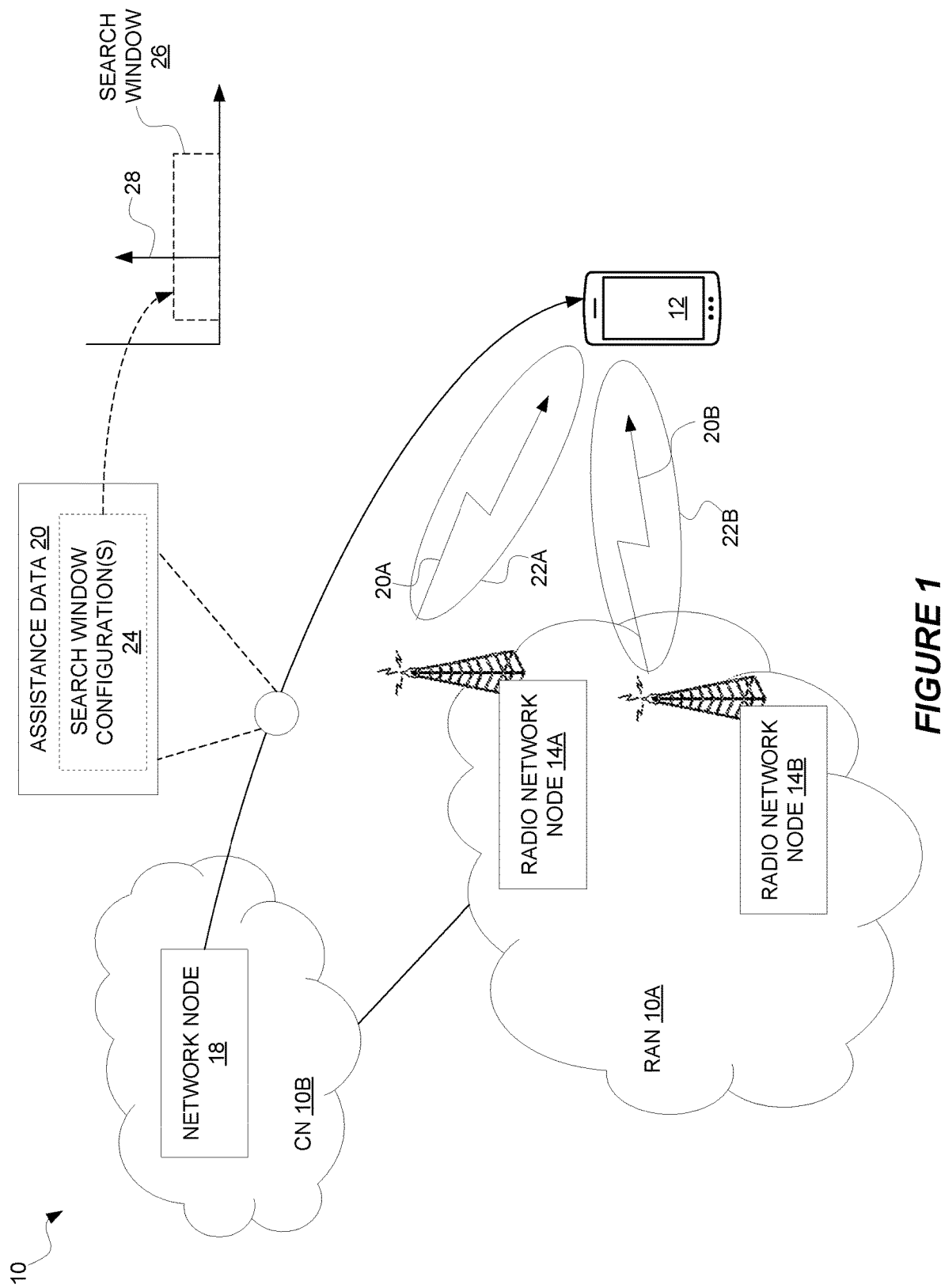
FIG. 1 is a block diagram of a wireless communication system according to some embodiments.

FIG. 1 shows a wireless communication system 10 according to some embodiments. The system 10 in some embodiments is a 5G system. The system 10 may include a radio access network (RAN) 10A and a core network (CN) 10B. The radio access network 10A is shown as providing radio access to a wireless device 12, e.g., a user equipment (UE), via one or more radio network nodes. The radio access network 10A in turn provides access to the core network 10B, which may connect the wireless device 12 to one or more other networks or systems such as the Internet.

FIG. 1 shows the wireless device 12 receives one or more signals 20A, 20B from one or more radio network nodes 14A, 14B. In embodiments where the wireless device 12 receives multiple signals 20A, 20B, those signals 20A, 20B may be received from the same radio network node (e.g., radio network node 14A) or from different radio network nodes. Regardless, in some embodiments, at least some of the signal(s) 20A, 20B are referred to as positioning signal(s) on which the wireless device 12 performs a positioning measurement. A positioning signal may for instance include a Positioning Reference Signal (PRS), a Tracking Reference Signal (TRS), or the like. The positioning measurement may for instance be a radio access technology (RAT) dependent positioning measurement, e.g., an Observed Time Difference of Arrival (OTDOA) measurement or a Reference Signal Time Difference (RSTD) measurement.

In some embodiments in this regard, the wireless device 12 performs the positioning measurement on only one positioning signal, e.g., on only one of the one or more signals 20A, 20B. In other embodiments, the wireless device 12 performs the positioning measurement on multiple positioning signals, e.g., on multiple ones of the signals 20A, 20B. In one such embodiment, one of the multiple positioning signals may be used as a reference for the positioning measurement, e.g., in the form of a reference link as described herein. In another embodiment, though, none of the multiple positioning signals are used as a reference for the positioning measurement in the sense used herein. For example, the positioning measurement may be performed on both of the signals 20A, 20B, with the result of the positioning measurement being a combination (e.g., average) of the result of the positioning measurement as performed on signal 20A and the result of the positioning measurement as performed on signal 20B.

In any event, the one or more signals 20A, 20B are transmitted according to one or more beamforming configurations, respectively. The beamforming configuration(s) are configurations according to which the respective signal(s) 20A, 20B are beamformed, e.g., such that the signal(s) 20A, 20B are directionally transmitted on one or more spatial beams 22A, 22B. The beamforming configuration used to transmit a signal may include for instance one or more of: (i) a number of beams, if any, in one or more spatial dimensions used to transmit the signal; (ii) a width of one or more beams used to transmit the signal; (iii) an elevation, tilt, orientation, and/or direction of the one or more beams; (iv) a coverage area, footprint, and/or size of the one or more beams; (v) a shape of the coverage area, footprint, and/or size; (vi) one or more intra-beam distances of the one or more beams; (vii) an inter-beam distance between the one or more beams; (viii) neighbor beam information; (ix) one or more transmit power levels associated with the one or more beams; (x) one or more beam-configuration dependent measurement ranges associated with the one or more beams; and/or (xi) one or more types of one or more signals or channels characterizing each of the one or more beams.

FIG. 1 illustrates a network node 18, shown as being in the core network 10B for instance. The network node 18 may for instance be a location server, e.g., implementing a Location Management Function (LMF), or may be configured to perform mobility management such as an access and mobility function (AMF). Regardless, the network node 18 provides assistance data 20 to the wireless device 12. The assistance data 20 assists the wireless device 12 with performing the positioning measurement. Indeed, the wireless device 12 is configured to perform the positioning measurement based on the assistance data 20.

In some embodiments, the assistance data 20 indicates a search window 26 within which a result 28 of the positioning measurement is expected to be. The assistance data 20 in some embodiments includes a search window configuration 24 which configures this search window 26. The assistance data 20 may indicate the search window 26 (e.g., using search window configuration 24) in terms of one or more parameters, such as an expected measurement result/value, an amount of the expected measurement uncertainty, an absolute or relative expected center of the search window 26, an absolute or relative start time of the search window 26, a size of the search window 26, a size of half of the search window 26, etc. Regardless, configured with such a search window 26, the wireless device 12 may deem the result of the positioning measurement valid only if the result 28 falls within the search window 26. The wireless device 12 may for instance perform the positioning measurement and then check whether the result of the positioning measurement falls within the search window 26. For example, where the positioning measurement is a timing-based measurement (e.g., an RSTD measurement or an OTDOA measurement) that yields a result in the time domain, the search window 26 may specify a window of time within which the result must fall in order for the result to be deemed a valid result.

Notably, the network node 18 in some embodiments determines the search window 26 to be indicated by the assistance data 20, based on the one or more beamforming configurations used to transmit the respective signal(s) 20A, 20B. Some embodiments may for instance tailor the search window 26 for the beamforming configuration(s), based on the understanding that different search windows may be optimal for different respective beamforming configuration(s). In these and other cases, then, some embodiments improve positioning accuracy and/or reduce processing demands required for positioning.

More particularly, in some embodiments where the positioning measurement is to be performed only on signal 20A, the search window 26 may be determined based on the beamforming configuration used to transmit that signal 20A. In other embodiments wherein the positioning measurement is to be performed on both signal 20A and signal 20B, the search window 26 may be determined based on the beamforming configuration used to transmit signal 20A and/or the beamforming configuration used to transmit signal 20B.

For example, in some embodiments, the network node 18 configures a first search window or a second search window, depending respectively on whether, according to the one or more beamforming configurations, beamforming is or is not used to transmit the one or more signals 20A, 20B or depending respectively on whether, according to the one or more beamforming configurations, a number of beams used to transmit the one or more signals 20A, 20B is or is not below a threshold. In other embodiments, the network node 18 configures a first search window or a second search window, depending respectively on whether, according to the one or more beamforming configurations, a width of one or more beams used to transmit the one or more signals 20A, 20B is or is not below a threshold.

In still other embodiments, the network node 18 configures a first search window or a second search window, depending respectively on whether the one or more signals 20A, 20B are transmitted in a first or a second frequency range, wherein the second frequency range is higher than the first frequency range. Alternatively or additionally, the network node 18 may configure a first search window or a second search window that is narrower than the first search window, depending respectively on whether, according to the one or more beamforming configurations, a maximum inter-beam distance between beams used to transmit the one or more signals 20A, 20B is or is not above a threshold. In still other embodiments, the network node 18 may configure a first search window or a second search window that is narrower than the first search window, depending respectively on whether, according to the one or more beamforming configurations, coverage areas of beams used to transmit the one or more signals 20A, 20B are or are not farther away than a threshold.

Regardless, having determined the search window 26 in any of these or other ways, the network node 18 in some embodiments indicates the search window 26 in the assistance data 20. The search window 26 as indicated in the assistance data 20 may be associated with a certain beamforming configuration, e.g., a beamforming configuration usable to transmit a positioning signal on which the positioning measurement is to be performed. For example, in some embodiments where the positioning measurement is to be performed on signal 20A, the assistance data 20 may indicate the search window 26 as being associated with a beamforming configuration usable to transmit that signal 20A. In other embodiments where the positioning measurement is to be performed on both signal 20A and signal 20B, the assistance data 20 may indicate the search window 26 as being associated with a beamforming configuration usable to transmit signal 20A and/or a beamforming configuration usable to transmit signal 20B. In any event, the search window 26 may be associated with a certain beamforming configuration via a beam identifier, a synchronization signal block (SSB) identifier, a transmission configuration indicator (TCI), or quasi-colocation (QCL) characteristics with respect to a signal, channel, or control resource set, where that signal, channel, or control resource set is associated with a beam, positioning reference signal set or resource that is beam-specific. In such a case, the assistance data 20 may indicate the association by including the beam identifier, SSB identifier, TCI, or QCL characteristics in the assistance data 20 with (i.e., in association with) the indicated search window 26.

Figure 2:
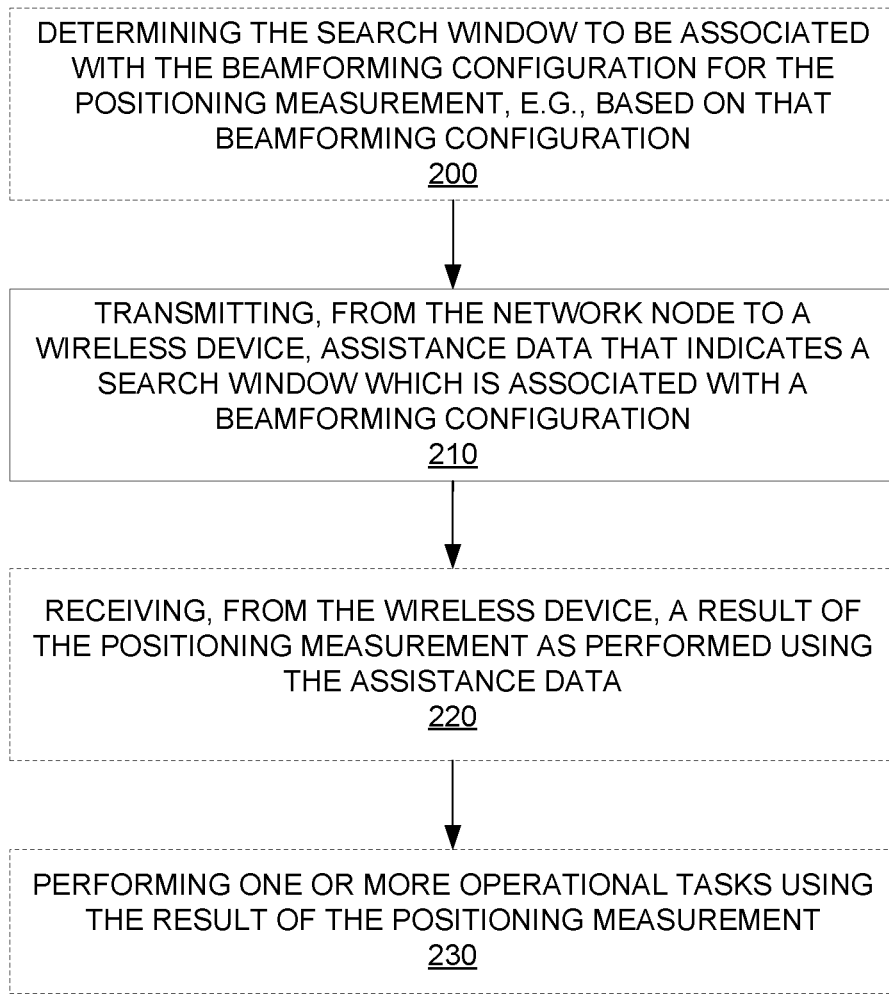
FIG. 2 is a logic flow diagram of a method performed by a network node according to some embodiments.

In view of the above modifications and variations, FIG. 2 depicts a method performed by a network node 18 in accordance with particular embodiments. The method includes transmitting, from the network node 18 to a wireless device 12, assistance data 20 that indicates a search window 26 which is associated with a beamforming configuration (Block 200). In some embodiments, the search window 26 associated with the beamforming configuration is a window within which a result 28 of a positioning measurement performed by the wireless device 12 on a positioning signal 20A is expected to be for the associated beamforming configuration.

In some embodiments, the beamforming configuration is usable to transmit the positioning signal 20A. In one such embodiment, the beamforming configuration may include at least one of any one or more of: a number of beams, if any, usable to transmit the positioning signal 20A; a width of a beam 22A usable to transmit the positioning signal 20A; an elevation, tilt, orientation, and/or direction of the beam 22A; a coverage area, footprint, and/or size of the beam 22A; a shape of the coverage area, footprint, and/or size; an intra-beam distance of the beam 22A; an inter-beam distance between the beam 22A and another beam 22B usable to transmit another positioning signal 20B on which the positioning measurement is to be performed; neighbor beam information; a transmit power level associated with the beam 22A; a beam-configuration dependent measurement range associated with the beam 22A; and a type of a signal or channel characterizing the beam.

In some embodiments, for example, the positioning measurement is to be performed on only the positioning signal 20A. In this case, the beamforming configuration associated with the search window 26 may be the beamforming configuration usable to transmit positioning signal 20A.

In other embodiments, though, the positioning signal 20A is first positioning signal 20A, and the positioning measurement is to be performed on both the first positioning signal 20A and a second positioning signal 20B, e.g., as transmitted by the same radio network node or different radio network nodes. In one such embodiment, for instance, the second positioning signal 20B is to be used as a reference for the positioning measurement, e.g., as a reference link. Regardless, the beamforming configuration associated with the search window 26 in this case may be a first beamforming configuration usable to transmit the first positioning signal 20A or a second beamforming configuration usable to transmit the second positioning signal 20B. In these and other embodiments, for instance, the positioning measurement may be a Time Difference of Arrival, TDOA, measurement or a Reference Signal Time Difference, RSTD, measurement.

In either case, the search window 26 may be associated with the beamforming configuration via a beam identifier, a synchronization signal block (SSB) identifier, a transmission configuration indicator (TCI), or quasi-colocation (QCL) characteristics with respect to a signal, channel, or control resource set, where that signal, channel, or control resource set is associated with a beam, positioning reference signal set or resource that is beam-specific.

In some embodiments, the method also comprises determining the search window 26 to be associated with the beamforming configuration for the positioning measurement, based on that beamforming configuration (Block 200). For example, in some embodiments, determining of the search window 26 (Block 200) includes determining the search window 26 to be associated with the beamforming configuration based on beam information associated with a beam used to transmit the positioning signal. The beam information associated with a beam may for instance comprises one or more of: an identifier of the beam; an identifier of a synchronization signal block transmitted on the beam; a quasi-colocation characteristic with respect to a signal, channel, or control resource set associated with the beam; a positioning signal resource set; or a resource specific to the beam.

Alternatively or additionally, determining of the search window 26 (Block 200) may include determining the search window 26 to be a first search window or a second search window, depending respectively on whether, according to the beamforming configuration, beamforming is or is not used to transmit the positioning signal or depending respectively on whether, according to the beamforming configuration, a number of beams used to transmit the positioning signal is or is not below a threshold.

In other embodiments, determining of the search window 26 (Block 200) may include determining the search window 26 to be a first search window or a second search window, depending respectively on whether according to the beamforming configuration, a width of one or more beams used to transmit the positioning signal is or is not below a threshold. Or, depending respectively on whether the positioning signal is transmitted in a first or a second frequency range, where the second frequency range is higher than the first frequency range.

Alternatively or additionally, determining of the search window 26 (Block 200) may include determining the search window 26 to be a first search window or a second search window that is narrower than the first search window, depending respectively on whether, according to the beamforming configuration, a maximum inter-beam distance between a beam used to transmit the positioning signal and a beam used to transmit another positioning signal on which the positioning measurement is performed is or is not above a threshold. Or, depending respectively on whether, according to the beamforming configuration, coverage areas of a beam used to transmit the positioning signal and a beam used to transmit another positioning signal on which the positioning measurement is performed are or are not farther away than a threshold.

No matter how the search window 26 is determined, though, the method in some embodiments also comprises receiving, from the wireless device 12, a result 28 of the positioning measurement as performed using the assistance data 20 (Block 220). In one such embodiment, the method may correspondingly include performing one or more operational tasks using the result 28 of the positioning measurement (Block 230). In these and other embodiments, for instance, the method may comprise determining a position of the wireless device 12, based on the result 28 of the positioning measurement.

Figure 3:
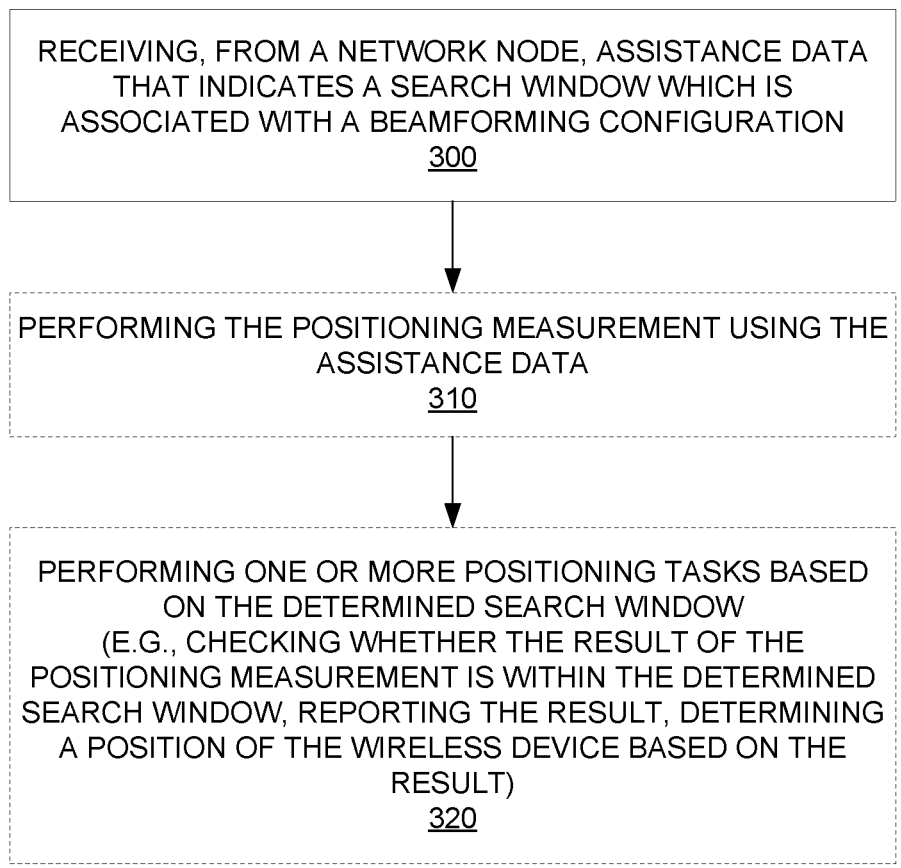
FIG. 3 is a logic flow diagram of a method performed by a wireless device according to some embodiments.

Also in view of the above modifications and variations, FIG. 3 depicts a method performed by a wireless device 12 in accordance with particular embodiments. The method includes receiving, from a network node 18, assistance data 20 that indicates a search window 26 which is associated with a beamforming configuration (Block 300). In some embodiments, the search window 26 associated with the beamforming configuration is a window within which a result 28 of a positioning measurement performed by the wireless device 12 on a positioning signal 20A is expected to be for the associated beamforming configuration In some embodiments, the beamforming configuration is usable to transmit the positioning signal 20A. In one such embodiment, the beamforming configuration includes at least one of any one or more of: a number of beams, if any, usable to transmit the positioning signal 20A; a width of a beam 22A usable to transmit the positioning signal 20A; an elevation, tilt, orientation, and/or direction of the beam 22A; a coverage area, footprint, and/or size of the beam 22A; a shape of the coverage area, footprint, and/or size; an intra-beam distance of the beam 22A; an inter-beam distance between the beam 22A and another beam 22B usable to transmit another positioning signal 20B on which the positioning measurement is to be performed; neighbor beam information; a transmit power level associated with the beam 22A; a beam-configuration dependent measurement range associated with the beam 22A; and a type of a signal or channel characterizing the beam.

In some embodiments, for example, the positioning measurement is to be performed on only the positioning signal 20A. In this case, the beamforming configuration associated with the search window 26 may be the beamforming configuration usable to transmit positioning signal 20A.

In other embodiments, though, the positioning signal 20A is first positioning signal 20A, and the positioning measurement is to be performed on both the first positioning signal 20A and a second positioning signal 20B, e.g., as transmitted by the same radio network node or different radio network nodes. In one such embodiment, for instance, the second positioning signal 20B is to be used as a reference for the positioning measurement, e.g., as a reference link. Regardless, the beamforming configuration associated with the search window 26 in this case may be a first beamforming configuration usable to transmit the first positioning signal 20A or a second beamforming configuration usable to transmit the second positioning signal 20B. In these and other embodiments, for instance, the positioning measurement may be a Time Difference of Arrival, TDOA, measurement or a Reference Signal Time Difference, RSTD, measurement.

In either case, the search window 26 may be associated with the beamforming configuration via a beam identifier, a synchronization signal block (SSB) identifier, a transmission configuration indicator (TCI), or quasi-colocation (QCL) characteristics with respect to a signal, channel, or control resource set, where that signal, channel, or control resource set is associated with a beam, positioning reference signal set or resource that is beam-specific.

The method in some embodiments also comprises performing the positioning measurement using the assistance data 20 (Block 310). In one such embodiment, the method may correspondingly include performing one or more positioning tasks using the result 28 of the positioning measurement (Block 320). In these and other embodiments, for instance, the method may comprise checking whether a result 28 of the performed positioning measurement falls within the indicated search window 26, and deeming the result 28 of the positioning measurement valid or invalid depending respectively on whether or not the result 28 falls within the indicated search window 26 according to that checking. Alternatively or additionally, the method may comprise reporting a result 28 of the positioning measurement, and/or determining a position of the wireless device 12, based on the result 28 of the positioning measurement.

In embodiments described above, the assistance data 20 includes a single search window configuration 24 indicating the search window 26 that the wireless device 12 is to use for the positioning measurement on a certain positioning signal 20A. In other embodiments, though, the assistance data 20 includes multiple search window configurations that indicate different search windows within which the result of the positioning measurement is expected to be for different respective beamforming configurations usable to transmit the signal(s) 20A, 20B. In this case, then, the wireless device 12 may determine which of the different respective beamforming configurations are used to transmit the one or more signals 20A, 20B, and then determine the search window that the assistance data 20 indicates is for the determined beamforming configuration.

In still other embodiments, the wireless device 12 itself determines the search window 26 based on the beamforming configuration(s) used to transmit the signal(s) 20A, 20B. The wireless device 12 may determine the search window 26 in the same way as described above for the network node 18.

Figure 4:
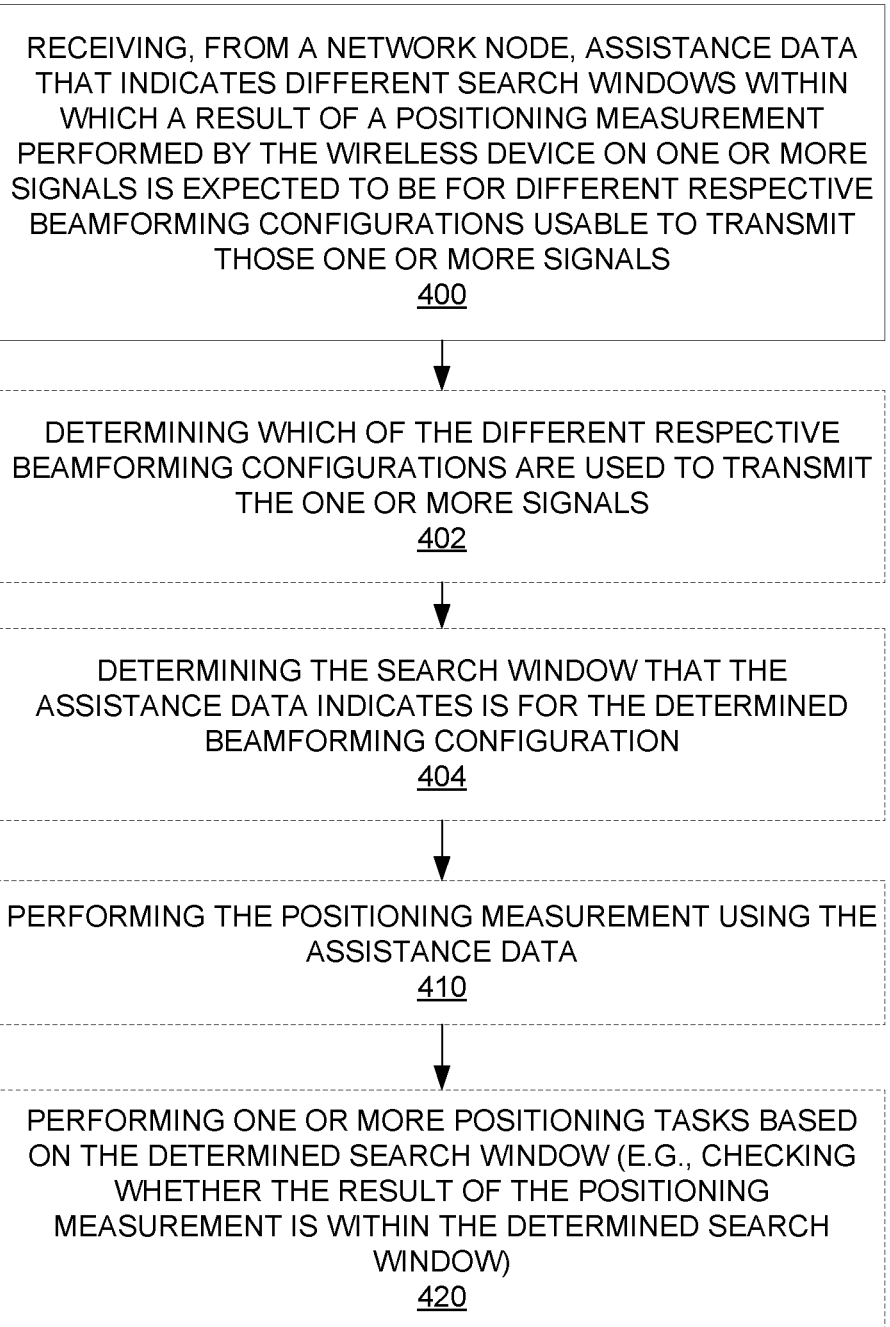
FIG. 4 is a logic flow diagram of a method performed by a wireless device according to other embodiments.

In view of the above modifications and variations, FIG. 4 depicts a method performed by a wireless device 12 in accordance with particular embodiments. The method includes receiving, from a network node 18, assistance data 20 that indicates different search windows within which a result of a positioning measurement performed by the wireless device 12 on one or more signals 20A, 20B is expected to be for different respective beamforming configurations usable to transmit those one or more signals 20A, 20B (Block 400). In some embodiments, the method further comprises performing the positioning measurement using the assistance data 20 (Block 410).

In some embodiments, the method also comprises determining which of the different respective beamforming configurations are used to transmit the one or more signals 20A, 20B (Block 402) and determining the search window that the assistance data 20 indicates is for the determined beamforming configuration (Block 404).

In some embodiments, the method also comprises performing one or more positioning tasks based on the determined search window (Block 420). The one or more positioning tasks may include for instance checking whether the result of the positioning measurement is within the determined search window.

In some embodiments, the method also comprises reporting the result of the positioning measurement to a network node. In other embodiments, the method may comprise determining a position of the wireless device 12, based on the result of the positioning measurement.

In some embodiments, a beamforming configuration used to transmit a positioning signal includes one or more of: a number of beams, if any, in one or more spatial dimensions used to transmit the one or more positioning signals; a width of one or more beams used to transmit the one or more positioning signals; an elevation, tilt, orientation, and/or direction of the one or more beams; a coverage area, footprint, and/or size of the one or more beams; a shape of the coverage area, footprint, and/or size; one or more intra-beam distances of the one or more beams; an inter-beam distance between the one or more beams; neighbor beam information; one or more transmit power levels associated with the one or more beams; one or more beam-configuration dependent measurement ranges associated with the one or more beams; one or more types of one or more signals or channels characterizing each of the one or more beams.

In some embodiments, the positioning measurement is an Observed Time Difference of Arrival, OTDOA, measurement or a Reference Signal Time Difference, RSTD, measurement.

Figure 5:
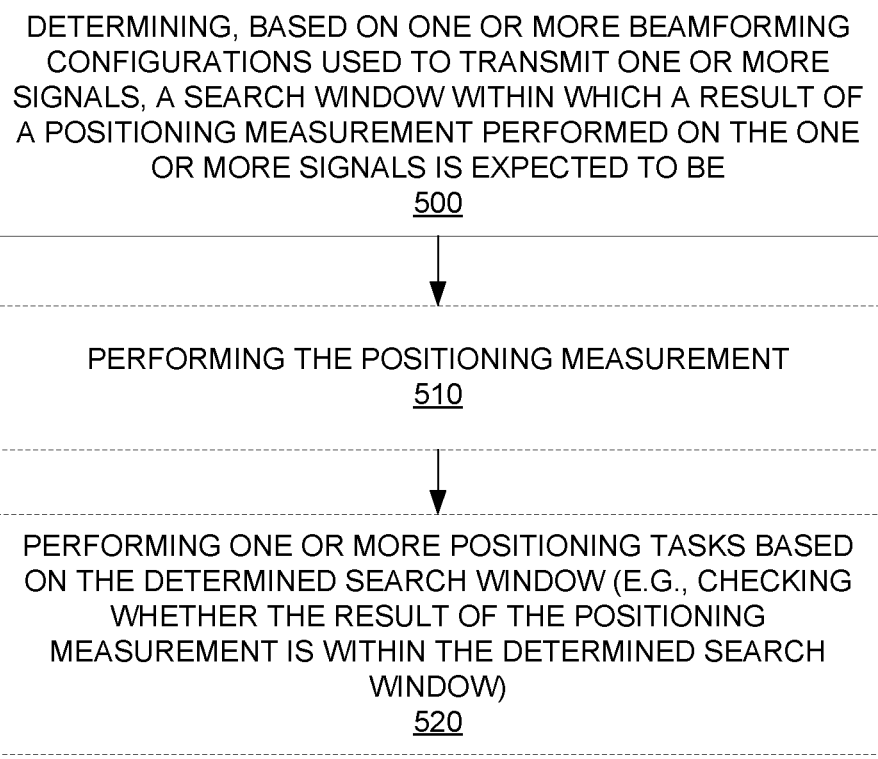
FIG. 5 is a logic flow diagram of a method performed by a wireless device according to yet other embodiments.

FIG. 5 depicts a method performed by a wireless device 12 in accordance with other particular embodiments. The method includes determining, based on one or more beamforming configurations used to transmit one or more signals 20A, 20B, a search window within which a result of a positioning measurement performed on the one or more signals 20A, 20B is expected to be (Block 500).

In some embodiments, different beams have respective beam configurations and are associated with different respective beam information. In one such embodiment, said determining comprises determining the search window based on beam information associated with one or more beams used to transmit the one or more positioning signals. In one embodiment, the beam information associated with a beam comprises one or more of: an identifier of the beam; an identifier of a synchronization signal block transmitted on the beam; a quasi-colocation characteristic with respect to a signal, channel, or control resource set associated with the beam; a positioning signal resource set; or a resource specific to the beam.

Alternatively or additionally, in some embodiments, said determining comprises determining the search window to be a first search window or a second search window, depending respectively on whether, according to the one or more beamforming configurations, beamforming is or is not used to transmit the one or more positioning signals or depending respectively on whether, according to the one or more beamforming configurations, a number of beams used to transmit the one or more positioning signals is or is not below a threshold.

Alternatively or additionally, in some embodiments, said determining comprises determining the search window to be a first search window or a second search window, depending respectively on whether, according to the one or more beamforming configurations, a width of one or more beams used to transmit the one or more positioning signals is or is not below a threshold.

Alternatively or additionally, in some embodiments, said determining comprises determining the search window to be a first search window or a second search window, depending respectively on whether the one or more positioning signals are transmitted in a first or a second frequency range, wherein the second frequency range is higher than the first frequency range.

Alternatively or additionally, in some embodiments, the positioning measurement is to be performed on first and second positioning signals transmitted using first and second beamforming configurations, where the first positioning signal is a reference signal for the positioning measurement. In one such embodiment, said determining comprises determining the search window based on either the second beamforming configuration or both the first and second beamforming configurations. For example, in one embodiment, said determining comprises determining which of the first and second beamforming configurations is associated with a widest beam, a highest frequency range, and/or a largest subcarrier spacing, and determining the search window based on the determined beamforming configuration.

Alternatively or additionally, in some embodiments, said determining comprises determining the search window to be a first search window or a second search window that is narrower than the first search window, depending respectively on whether, according to the one or more beamforming configurations, a maximum inter-beam distance between beams used to transmit the one or more positioning signals is or is not above a threshold.

Alternatively or additionally, in some embodiments, said determining comprises determining the search window to be a first search window or a second search window that is narrower than the first search window, depending respectively on whether, according to the one or more beamforming configurations, coverage areas of beams used to transmit the one or more positioning signals are or are not farther away than a threshold.

Regardless, in some embodiments, the method further comprises performing the positioning measurement using the assistance data 20 (Block 510).

In some embodiments, the method also comprises performing one or more positioning tasks based on the determined search window (Block 520). The one or more positioning tasks may include for instance checking whether the result of the positioning measurement is within the determined search window.

In some embodiments, the method also comprises reporting the result of the positioning measurement to a network node. In other embodiments, the method may comprise determining a position of the wireless device 12, based on the result of the positioning measurement.

In some embodiments, a beamforming configuration used to transmit a positioning signal includes one or more of: a number of beams, if any, in one or more spatial dimensions used to transmit the one or more positioning signals; a width of one or more beams used to transmit the one or more positioning signals; an elevation, tilt, orientation, and/or direction of the one or more beams; a coverage area, footprint, and/or size of the one or more beams; a shape of the coverage area, footprint, and/or size; one or more intra-beam distances of the one or more beams; an inter-beam distance between the one or more beams; neighbor beam information; one or more transmit power levels associated with the one or more beams; one or more beam-configuration dependent measurement ranges associated with the one or more beams; one or more types of one or more signals or channels characterizing each of the one or more beams.

In some embodiments, the positioning measurement is an Observed Time Difference of Arrival, OTDOA, measurement or a Reference Signal Time Difference, RSTD, measurement.

FIG. 6 depicts a method performed by a network node 18 in accordance with still other particular embodiments. The method includes transmitting, from the network node 18 to a wireless device 12, assistance data 20 that indicates different search windows within which a result of a positioning measurement performed by the wireless device 12 on one or more signals 20A, 20B is expected to be for different respective beamforming configurations usable to transmit those one or more signals 20A, 20B (Block 600). In some embodiments, the method further comprises receiving, from the wireless device 12, a result of the positioning measurement as performed using the assistance data 20 (Block 610).

In some embodiments, the method also comprises performing one or more operational tasks using the result of the positioning measurement (Block 620). The one or more operational tasks may include for instance determining a position of the wireless device 12, based on the result of the positioning measurement.

In some embodiments, different beams have respective beam configurations and are associated with different respective beam information. In one such embodiment, said determining comprises determining the search window based on beam information associated with one or more beams used to transmit the one or more positioning signals. In one embodiment, the beam information associated with a beam comprises one or more of: an identifier of the beam; an identifier of a synchronization signal block transmitted on the beam; a quasi-colocation characteristic with respect to a signal, channel, or control resource set associated with the beam; a positioning signal resource set; or a resource specific to the beam.

Alternatively or additionally, in some embodiments, said determining comprises determining the search window to be a first search window or a second search window, depending respectively on whether, according to the one or more beamforming configurations, beamforming is or is not used to transmit the one or more positioning signals or depending respectively on whether, according to the one or more beamforming configurations, a number of beams used to transmit the one or more positioning signals is or is not below a threshold.

Alternatively or additionally, in some embodiments, said determining comprises determining the search window to be a first search window or a second search window, depending respectively on whether, according to the one or more beamforming configurations, a width of one or more beams used to transmit the one or more positioning signals is or is not below a threshold.

Alternatively or additionally, in some embodiments, said determining comprises determining the search window to be a first search window or a second search window, depending respectively on whether the one or more positioning signals are transmitted in a first or a second frequency range, wherein the second frequency range is higher than the first frequency range.

Alternatively or additionally, in some embodiments, the positioning measurement is to be performed on first and second positioning signals transmitted using first and second beamforming configurations, where the first positioning signal is a reference signal for the positioning measurement. In one such embodiment, said determining comprises determining the search window based on either the second beamforming configuration or both the first and second beamforming configurations. For example, in one embodiment, said determining comprises determining which of the first and second beamforming configurations is associated with a widest beam, a highest frequency range, and/or a largest subcarrier spacing, and determining the search window based on the determined beamforming configuration.

Alternatively or additionally, in some embodiments, said determining comprises determining the search window to be a first search window or a second search window that is narrower than the first search window, depending respectively on whether, according to the one or more beamforming configurations, a maximum inter-beam distance between beams used to transmit the one or more positioning signals is or is not above a threshold.

Alternatively or additionally, in some embodiments, said determining comprises determining the search window to be a first search window or a second search window that is narrower than the first search window, depending respectively on whether, according to the one or more beamforming configurations, coverage areas of beams used to transmit the one or more positioning signals are or are not farther away than a threshold.

In some embodiments, a beamforming configuration used to transmit a positioning signal includes one or more of: a number of beams, if any, in one or more spatial dimensions used to transmit the one or more positioning signals; a width of one or more beams used to transmit the one or more positioning signals; an elevation, tilt, orientation, and/or direction of the one or more beams; a coverage area, footprint, and/or size of the one or more beams; a shape of the coverage area, footprint, and/or size; one or more intra-beam distances of the one or more beams; an inter-beam distance between the one or more beams; neighbor beam information; one or more transmit power levels associated with the one or more beams; one or more beam-configuration dependent measurement ranges associated with the one or more beams; one or more types of one or more signals or channels characterizing each of the one or more beams.

In some embodiments, the positioning measurement is an Observed Time Difference of Arrival, OTDOA, measurement or a Reference Signal Time Difference, RSTD, measurement.

Figure 7:
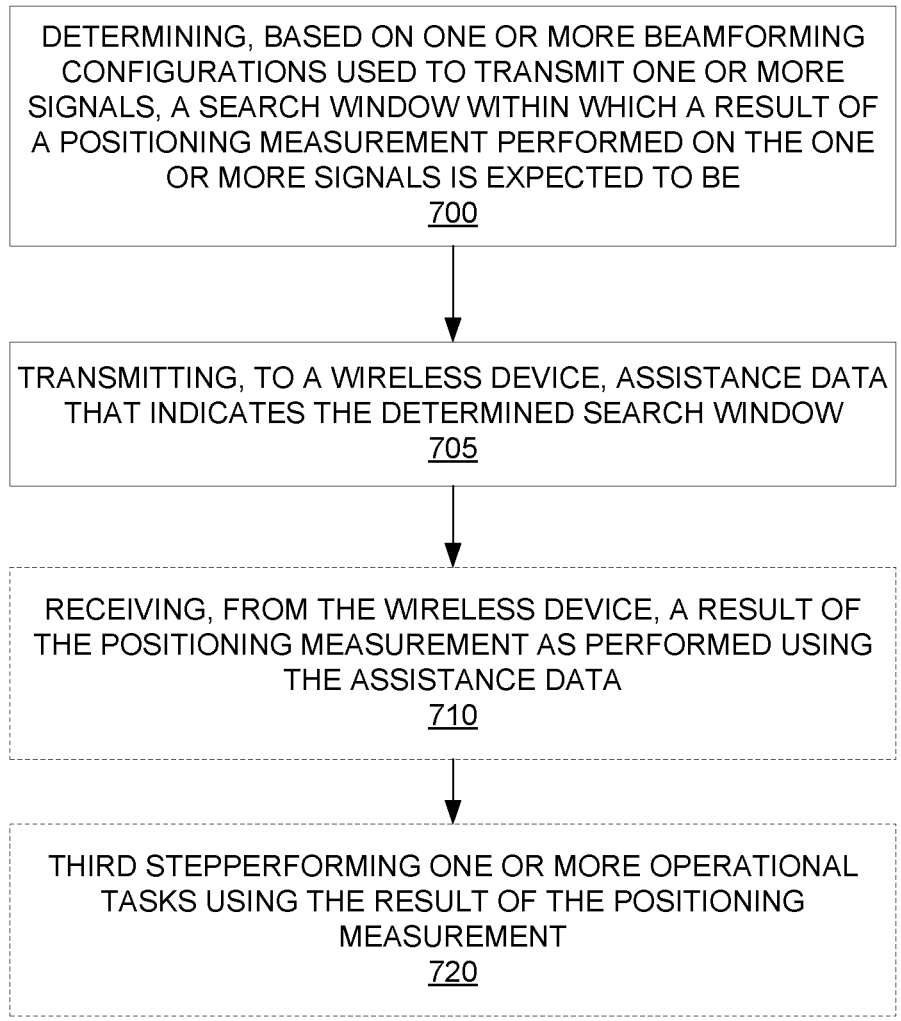
FIG. 7 is a logic flow diagram of a method performed by a network node according to still other embodiments.

FIG. 7 depicts a method performed by a network node 18 in accordance with yet other particular embodiments. The method includes determining, based on one or more beamforming configurations used to transmit one or more signals 20A, a search window 26 within which a result of a positioning measurement performed on the one or more signals 20A, 20B is expected to be (Block 700). The method also includes transmitting, to a wireless device 12, assistance data 20 that indicates the determined search window 26 (Block 705). In some embodiments, the method further comprises receiving, from the wireless device 12, a result 28 of the positioning measurement as performed using the assistance data 20 (Block 710).

In some embodiments, the method also comprises performing one or more operational tasks using the result 28 of the positioning measurement (Block 720). The one or more operational tasks may include for instance determining a position of the wireless device 12, based on the result 28 of the positioning measurement.

In some embodiments, different beams have respective beam configurations and are associated with different respective beam information. In one such embodiment, said determining comprises determining the search window based on beam information associated with one or more beams used to transmit the one or more positioning signals. In one embodiment, the beam information associated with a beam comprises one or more of: an identifier of the beam; an identifier of a synchronization signal block transmitted on the beam; a quasi-colocation characteristic with respect to a signal, channel, or control resource set associated with the beam; a positioning signal resource set; or a resource specific to the beam.

Alternatively or additionally, in some embodiments, said determining comprises determining the search window to be a first search window or a second search window, depending respectively on whether, according to the one or more beamforming configurations, beamforming is or is not used to transmit the one or more positioning signals or depending respectively on whether, according to the one or more beamforming configurations, a number of beams used to transmit the one or more positioning signals is or is not below a threshold.

Alternatively or additionally, in some embodiments, said determining comprises determining the search window to be a first search window or a second search window, depending respectively on whether, according to the one or more beamforming configurations, a width of one or more beams used to transmit the one or more positioning signals is or is not below a threshold.

Alternatively or additionally, in some embodiments, said determining comprises determining the search window to be a first search window or a second search window, depending respectively on whether the one or more positioning signals are transmitted in a first or a second frequency range, wherein the second frequency range is higher than the first frequency range.

Alternatively or additionally, in some embodiments, the positioning measurement is to be performed on first and second positioning signals transmitted using first and second beamforming configurations, where the first positioning signal is a reference signal for the positioning measurement. In one such embodiment, said determining comprises determining the search window based on either the second beamforming configuration or both the first and second beamforming configurations. For example, in one embodiment, said determining comprises determining which of the first and second beamforming configurations is associated with a widest beam, a highest frequency range, and/or a largest subcarrier spacing, and determining the search window based on the determined beamforming configuration.

Alternatively or additionally, in some embodiments, said determining comprises determining the search window to be a first search window or a second search window that is narrower than the first search window, depending respectively on whether, according to the one or more beamforming configurations, a maximum inter-beam distance between beams used to transmit the one or more positioning signals is or is not above a threshold.

Alternatively or additionally, in some embodiments, said determining comprises determining the search window to be a first search window or a second search window that is narrower than the first search window, depending respectively on whether, according to the one or more beamforming configurations, coverage areas of beams used to transmit the one or more positioning signals are or are not farther away than a threshold.

In some embodiments, a beamforming configuration used to transmit a positioning signal includes one or more of: a number of beams, if any, in one or more spatial dimensions used to transmit the one or more positioning signals; a width of one or more beams used to transmit the one or more positioning signals; an elevation, tilt, orientation, and/or direction of the one or more beams; a coverage area, footprint, and/or size of the one or more beams; a shape of the coverage area, footprint, and/or size; one or more intra-beam distances of the one or more beams; an inter-beam distance between the one or more beams; neighbor beam information; one or more transmit power levels associated with the one or more beams; one or more beam-configuration dependent measurement ranges associated with the one or more beams; one or more types of one or more signals or channels characterizing each of the one or more beams.

In some embodiments, the positioning measurement is an Observed Time Difference of Arrival, OTDOA, measurement or a Reference Signal Time Difference, RSTD, measurement.

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 18 configured to perform any of the steps of any of the embodiments described above for the network node 18.

Embodiments also include a network node 18 comprising processing circuitry and power supply circuitry. The processing circuitry is configured to perform any of the steps of any of the embodiments described above for the network node 18. The power supply circuitry is configured to supply power to the network node 18.

Embodiments further include a network node 18 comprising processing circuitry. The processing circuitry is configured to perform any of the steps of any of the embodiments described above for the network node 18. In some embodiments, the network node 18 further comprises communication circuitry.

Embodiments further include a network node 18 comprising processing circuitry and memory. The memory contains instructions executable by the processing circuitry whereby the network node 18 is configured to perform any of the steps of any of the embodiments described above for the network node 18.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
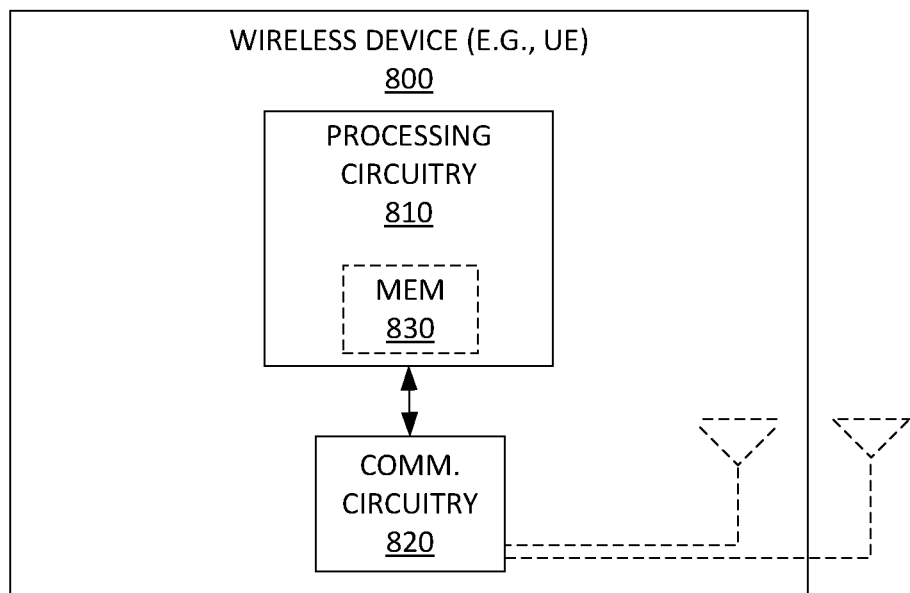
FIG. 8 is a block diagram of a wireless device according to some embodiments.

FIG. 8 for example illustrates a wireless device 12 as implemented in accordance with one or more embodiments. As shown, the wireless device 12 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 12. The processing circuitry 810 is configured to perform processing described above, e.g., in FIG. 3, FIG. 4 and/or FIG. 5, such as by executing instructions stored in memory 830. The processing circuitry 810 in this regard may implement certain functional means, units, or modules.

Figure 9:
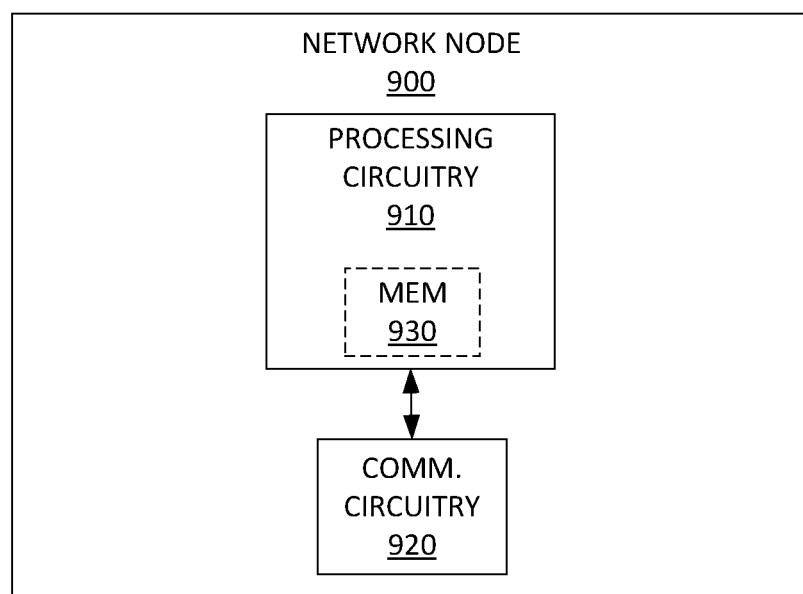
FIG. 9 is a block diagram of a network node according to some embodiments.

FIG. 9 illustrates a network node 18 as implemented in accordance with one or more embodiments. As shown, the network node 18 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 2, FIG. 6, and/or FIG. 7 such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments, for example, are applicable to User equipment (UE) positioning in a Long Term Evolution (LTE) network. Such positioning is an important feature due to its potential for massive commercial applications (for example intelligent transportation, entertainment, industry automation, robotics, remote operation, healthcare, smart parking and so on) as well as its relevance to United States (US) Federal Communications Commission (FCC) E911 requirements.

Figure 10:
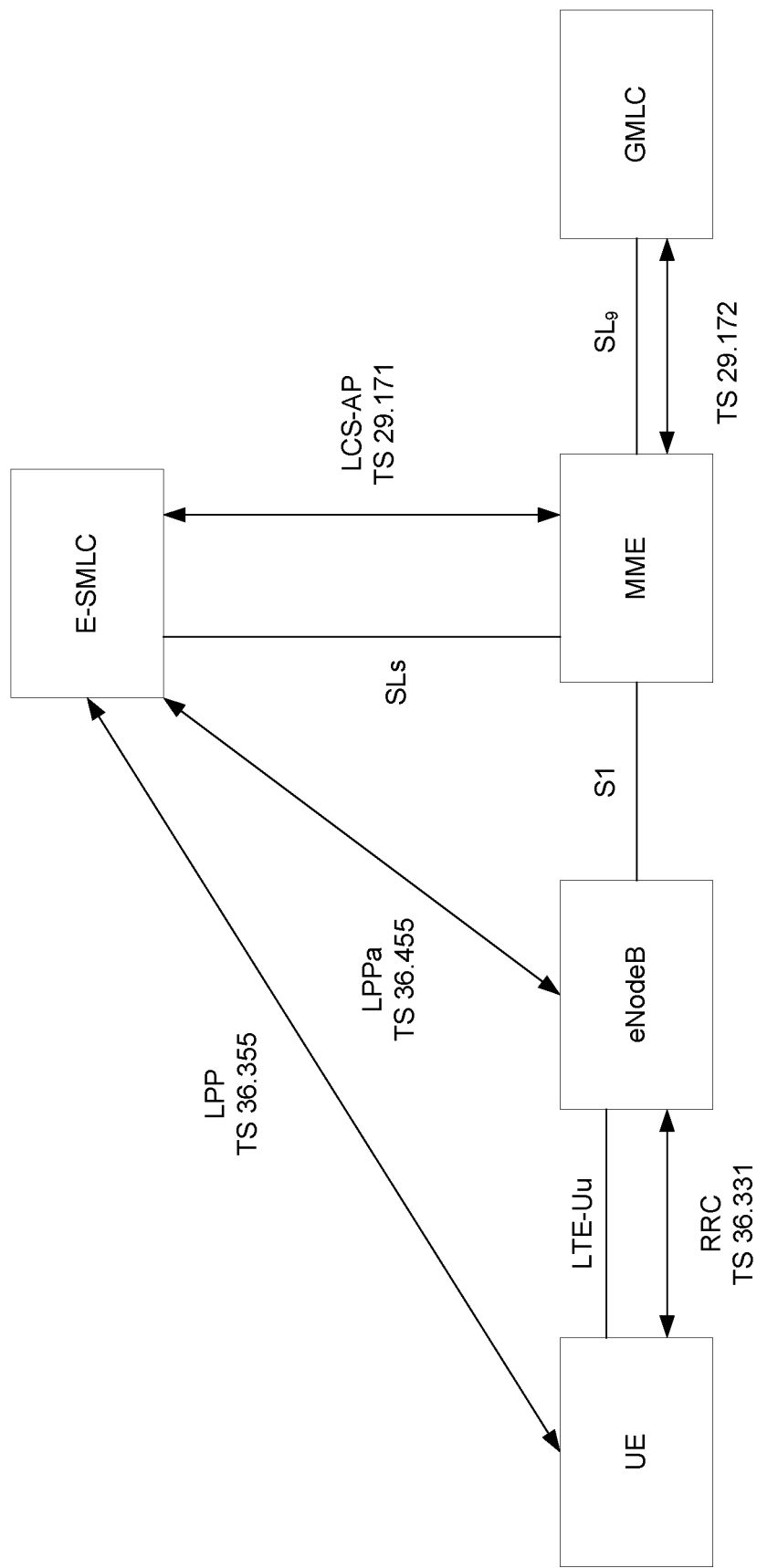
FIG. 10 is a block diagram of a Long Term Evolution (LTE) network architecture according to some embodiments.

Positioning in some embodiments is performed in the context of an LTE supported by an architecture such as shown in FIG. 10. Direct interactions occur between a UE and a location server (Evolved Serving Mobile Location Center, or E-SMLC) via the LTE Positioning Protocol (LPP). Moreover, there are also interactions between the location server and the eNodeB via the LPPa protocol, to some extent supported by interactions between the eNodeB and the UE via the Radio Resource Control (RRC) protocol.

The following positioning techniques are considered in LTE according to some embodiments. First, the Enhanced Cell ID technique exploits cell ID information to associate the UE to the serving area of a serving cell, and then additional information to determine a finer granularity position. Second, the Assisted Global Navigation Satellite System (GNSS) technique uses information retrieved by the UE, supported by assistance information provided to the UE from E-SMLC. Third, in the OTDOA (Observed Time Difference of Arrival) technique, the UE estimates the time difference of reference signals from different base stations and sends the estimated time difference to the E-SMLC for multilateration. Fourth, in the UTDOA (Uplink TDOA) technique, the UE is requested to transmit a specific waveform that is detected by multiple location measurement units (e.g. an eNB) at known positions. These measurements are forwarded to E-SMLC for multilateration.

Figure 11:
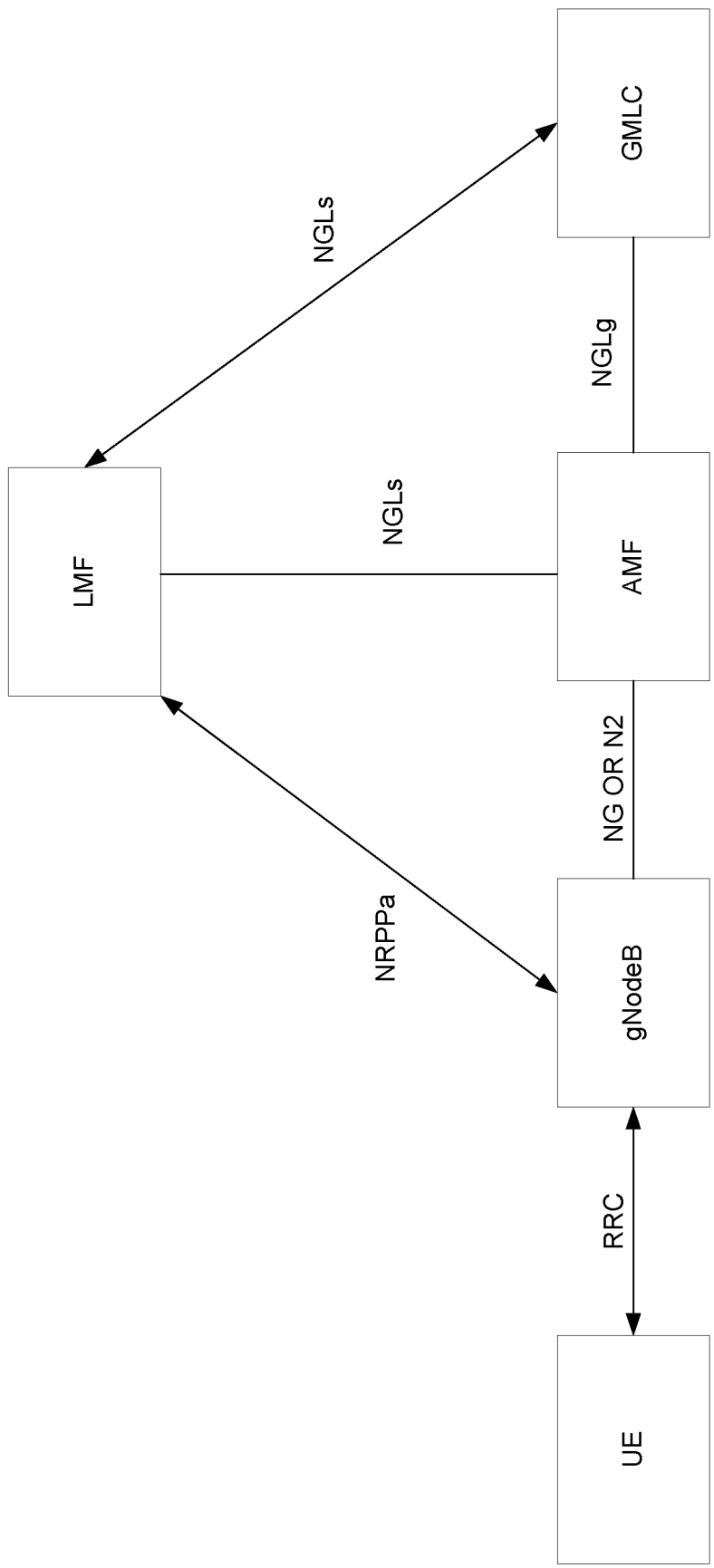
FIG. 11 is a block diagram of a New Radio (NR) network architecture according to some embodiments.

In some embodiments, positioning is performed in the context of a 3GPP New Radio (NR) network supported by the architecture shown in FIG. 11. The Location Management Function (LMF) is the location server in NR, e.g., as an example of network node 18. There are also interactions between the location server and the radio network node via the NR Positioning Protocol A (NRPPa) protocol. The interactions between the radio network node and the device is supported via the Radio Resource Control (RRC) protocol.

In some embodiments NR positioning reference signal (e.g. LTE like new positioning reference signals (PRS), tracking reference signal (TSR), Synchronization Signals) are transmitted through beams. FIG. 12 for example shows a UE receiving multiple beams from a transmission point. The UE performs beam-specific Reference Signal Time Difference (RSTD) measurements based on reference signals for positioning (e.g., PRS transmitted via different beams).

Some embodiments herein address challenge(s) with existing downlink positioning approaches whereby each radio network node transmits PRS with a pre-planned configuration and the transmission of these PRS are done all the time, at regular intervals. Some embodiments in this regard include the E-SMLC location server providing PRS configuration details to the UE using the LPP. The location server may also include OTDOA assistance data (AD) to facilitate the UE in performing the TDOA estimations. Some embodiments, in particular, provide a better Expected RSTD value and/or a narrower search window to the UE in the assistance data, e.g., in order to mitigate any location error or thus basically to improve the location estimation. The Expected RSTD, and search window 26 as exemplified by expected RSTD uncertainty, may be described as below within the assistance data. See, e.g., 3GPP Technical Specification (TS) 36.355 v15.4.0.

expectedRSTD

If PRS is transmitted:

This field indicates the RSTD value that the target device is expected to measure between this cell and the assistance data reference cell. The expectedRSTD field takes into account the expected propagation time difference as well as transmit time difference of PRS positioning occasions between the two cells. The RSTD value can be negative and is calculated as (expectedRSTD-8192). The resolution is $3 \times T_s$, with $T_s=1/(15000*2048)$ seconds.

If PRS is not transmitted:

This field indicates the RSTD value that the target device is expected to measure between this cell and the assistance data reference cell. The expectedRSTD field takes into account the expected propagation time difference as well as transmit time difference between the two cells. The RSTD value can be negative and is calculated as (expectedRSTD-8192). The resolution is $3"T_s$, with $T_s=1/(15000*2048)$ seconds.

expectedRSTD-Uncertainty

If PRS is transmitted:

This field indicates the uncertainty in expectedRSTD value. The uncertainty is related to the location server's a-priori estimation of the target device location. The expectedRSTD and expectedRSTD-Uncertainty together define the search window for the target device.

The scale factor of the expectedRSTD-Uncertainty field is $3 \times T_s$, with $T_s=1/(15000*2048)$ seconds.

The target device may assume that the beginning of the PRS occasion group of the PRS configuration with the longest PRS occasion group periodicity (NOTE) of the neighbour cell is received within the search window of size [-expectedRSTD-Uncertainty$\times 3 \times T_s$, expectedRSTD-Uncertainty$\times 3 \times T_s$] centered at $T_{REF}+1$ millisecond$\times$N+(expectedRSTD-8192)$\times 3 \times T_s$, where $T_{REF}$ is the reception time of the beginning of the first PRS occasion group of the first PRS configuration of the assistance data reference cell at the target device antenna connector, N=0 when the EARFCN of the neighbour cell is equal to that of the assistance data reference cell, and N=prs-SubframeOffset otherwise.

If PRS is not transmitted:

This field indicates the uncertainty in expectedRSTD value. The uncertainty is related to the location server's a-priori estimation of the target device location. The expectedRSTD and expectedRSTD-Uncertainty together define the search window for the target device. The scale factor of the expectedRSTD-Uncertainty field is $3 \times T_s$, with $T_s=1/(15000*2048)$ seconds.

If $T_x$ is the reception time of the beginning of the subframe X of the assistance data reference cell at the target device antenna connector, the target device may assume that the beginning of the closest subframe of this neighbour cell to subframe X is received within the search window of size [□ expectedRSTD-Uncertainty×3×$T_s$, expectedRSTD-Uncertainty×3×$T_s$] centered at $T_x$+(expectedRSTD□8192)×3×$T_s$.

In NR, the exact Reference signal(s) to be used for positioning have not yet been specified. Depending on the characteristics of the transmitted PRSs and the network implementation it may happen that the delay difference between some pairs of received PRSs, which are otherwise relevant for positioning, are quite different from the theoretical or expected value covered by the PRS signals. Especially in FR2, it is expected that the UE while performing time of arrival (TOA) estimation may encounter aliasing, sidelobes with mmWave length transmission, using larger subcarrier spacing and larger inter-site distance, e.g., in Urban Macro (UMa) environments. In such scenario, the network should provide better support to the UE as compared to what was done in LTE, especially to filter out any outliers, to be able to narrow down the RSTD search window and with de-aliasing.

As an example of how the search window 26 in FIG. 1 may be determined based on beamforming configuration, some embodiments thereby advantageously adapt the search window configuration for a positioning measurement (e.g., RSTD) to the beamformed transmission configuration of radio signals used for positioning measurements. The adapting may comprise selecting from a set of pre-defined search window configurations, based on the beam configuration, or determining one or more parameters of the search window configuration, based on the beam configuration. This may be especially important because larger bandwidths are to be used in NR. This is to better assist the UE in receiving positioning signals and keep the UE complexity (e.g., memory, sampling rate, receiving and search algorithms, etc.) at an affordable level.

In one example, the search window is determined by a network node, e.g., network node 18. The search window is then provided to the UE, e.g., exemplifying the wireless device 12, to assist the UE in performing a positioning measurement.

In another example, the search window is determined by the UE itself and used for performing a positioning measurement. In this case, the UE may determine the beam configuration used for transmitting positioning signals from the network and determine the search window configuration adaptively.

The search window configuration impacts the measurement accuracy, the time spent for the measurement, and/or the amount of UE resources spent for the measurement. UEs may also be required and tested to meet some requirements (e.g., measurement accuracy requirements, measurement period requirements, measurement reporting requirements, etc.) under a specific assumption about the search window configuration, which may effectively imply that it is possible with a first search window configuration but not with the second search window configurations.

Generally, then, some embodiments provide a better Expected RSTD value to the UE in the assistance data in order to mitigate any location error or thus basically to improve the location estimation. Some embodiments are also expected to remove the aliasing and outliers.

Certain embodiments may provide one or more of the following technical advantage(s). First, some embodiments may providing better expected RSTD value and narrower search window by considering Beams, thus improving the accuracy of the position. Second, some embodiments removing outliers. By knowing the more precise RSTD expected value, the TOA for aliased impulses outliers can to a large extent be removed. Outliers may also exist by falsely detecting strong noise samples as impulses. Such false impulses may also be discarded, since they are not consistent with the provided expected RSTD value. Third, some embodiments offer the possibility to provide more accurate positioning assistance data to the UE.

Figure 13:
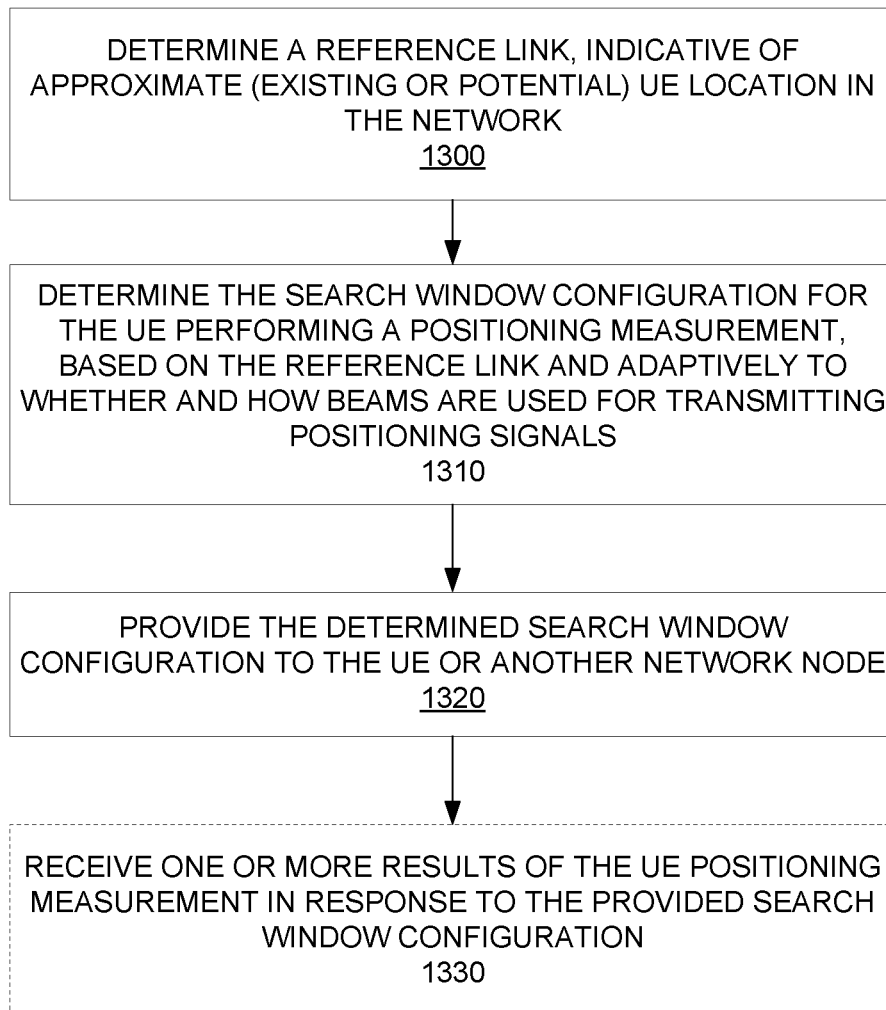
FIG. 13 is a logic flow diagram of a method performed by a network node according to other embodiments.

As an example of the method in FIG. 2 and/or FIG. 7, FIG. 13 shows steps of a method from the perspective of a network node, e.g., network node 18. The network node may for example be a location server or base station or operation and maintenance (O&M) node or self-organizing network (SON) node.

In Step 1300, the network node in one example determines a reference link for the UE based on an indication or message from the UE or another network node (e.g., its serving base station, mobility management entity (MME) or similar). The reference link may also be a preferred reference link indicated by the UE for the positioning measurements.

This step may also comprise determining the need to perform a positioning measurement by at least one UE, e.g., upon an explicit or implicit indication from UE or another network node or request for assistance data received from the UE.

In Step 1310, the network node may determine the search window configuration for the UE performing a positioning measurement, based on the reference link and adaptively to whether and how beams are used for transmitting positioning signals.

The determining may comprise calculation, determining based on a pre-defined rule, pre-configured table, or a standard. The determining may also comprise loading or extracting from memory an earlier used configuration, e.g., in similar conditions and/or for the same reference link and/or for the same positioning measurement (e.g., RSTD between same cells or beams).

In another example, the network node may determine the search window based on a message from another network node when the other network node determines or calculates the search window configuration (see the related embodiment in step 1320 when one network node provides this information to another network).

In Step 1320, the network node provides the search window configuration to the UE or another network node. This may further comprise including it into the assistance data, e.g., positioning assistance data or OTDOA assistance data. The determined search window may be associated with one or more beam-based measurement or corresponding beam configuration, e.g., via beam ID, synchronization signal block (SSB) ID, transmission configuration indicator (TCI) or quasi-colocation (QCL) characteristics with respect to a signal/channel/CORESET (control resource set) associated with a beam, PRS resource set or resource which may be beam specific, etc.—hence measurements on different beams, even within the same cell, may be configured with different search windows.

Providing the search window configuration may comprising signaling it to one or more UE via dedicated signaling (e.g., radio resource control, RRC, or protocol between location server and UE), multicast or broadcast (e.g., in common system information or on-demand system information).

The determined search window configuration may be provided to another network node, e.g., from base station or SON/O&M node to a location server or from location server to a base station. The receiving network node can then use this information to configure the search window in the UE.

In Step 1330, some UE may perform a positioning measurement in response to the received assistance data comprising search window configuration and report one or more results of the positioning measurement to this or another network node. Alternatively or additionally, some UE may perform the positioning measurement and use it for one or more operational tasks, e.g., for UE positioning or location-based or location-aware services.

Figure 14:
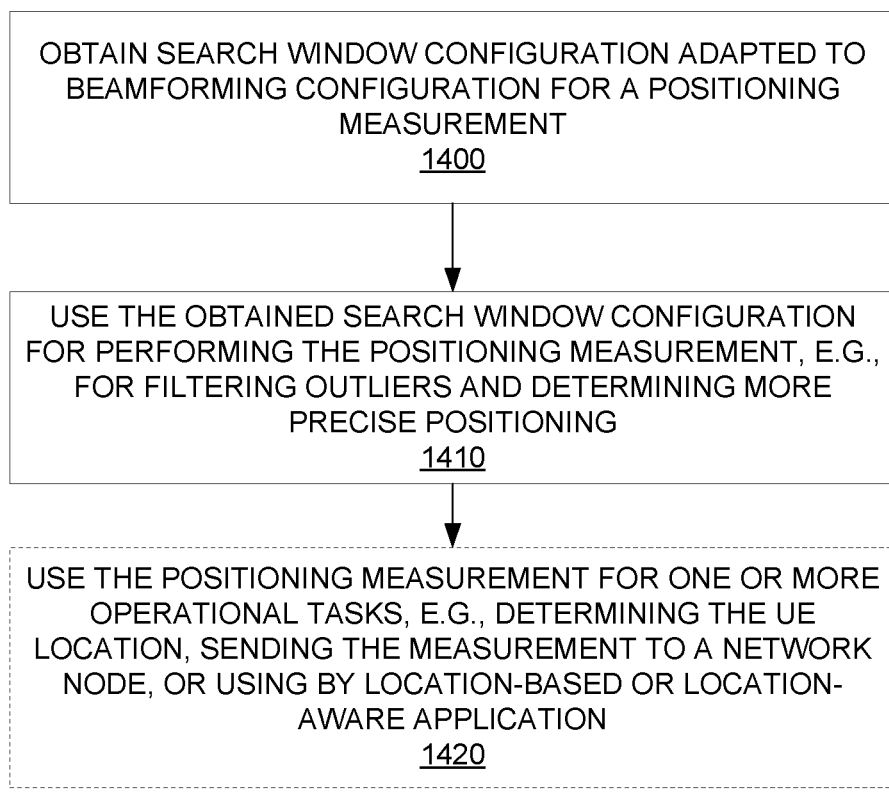
FIG. 14 is a logic flow diagram of a method performed by a user equipment according to other embodiments.

As an example of the method in FIG. 3 and/or FIG. 5, FIG. 14 shows steps from the UE perspective according to some embodiments.

See corresponding steps in the network node embodiment (FIG. 13) for the case when the search window configuration is obtained from a network node.

For the case when the UE autonomously determines the search window configuration, the UE may determine the network beam configuration (e.g., detect beam and/or receive beam-related configuration from the network) and adaptively determine the search window configuration based on similar principles described for the network node.

Other embodiments herein include a method for determining search window configuration adaptively to beam configuration, e.g., for implementing Block 200 of FIG. 2, Block 500 of FIG. 5, Block 700 of FIG. 7, Step 1310 of FIG. 13, and/or Step 1400 of FIG. 14.

In one embodiment, the location server or UE determines the search window configuration based on the beam configuration of one or more cells or transmitting points, wherein the beam configuration may comprise one or more of:

Reference link,
Number of beams (e.g., in total, vertical, horizontal, etc.),
Beam width,
Beam elevation, tilt, orientation, direction,
Beam coverage area or footprint and its size, e.g., beam footprint in 2D or beam coverage in 3D,
Shape of the beam coverage area or footprint (e.g., polygon, ellipse, circle, etc.),
Maximum distance within an individual beam coverage (a.k.a. "intra-beam distance"),
Inter-beam distance (may be determined, e.g., based on the number of beams that the respective base stations are transmitting, inter-site distance and intra-beam distance),
Neighbor beam information (e.g., for a given beam its neighbor beam list or a set of first-level neighbors, second-level neighbors which are further away than the first-level neighbors but closer than the third-level neighbors, etc.),
Transmit power level associated with the beam,
Beam-configuration dependent measurement range, measurement report mapping table, or minimum/maximum of beam-based RSTD values supported in the network,
Type of signal(s)/channel(s) characterizing the beam, e.g., SSB or channel state information reference signal (CSI-RS) so that other signals/channels are assumed to be transmitted via the same beams if having certain co-location or quasi-collocation properties with these signals/channels.

Consider various examples of rules for determining the search window configuration. In one example, a first search window configuration is determined if beamforming is used, and a second search window configuration is determined if beamforming is not used or the number of beams is below a threshold.

In another example, a first search window configuration is determined if a first beamforming configuration (e.g., with wider beams) is used, and a second search window configuration is determined if a second beamforming configuration (e.g., with narrower beams) is used.

In yet another example, a first search window configuration is determined if the positioning measurement is to be performed in a first frequency range (e.g., FR1) characterized by a number of beams below a threshold or no beamforming, and a second search window configuration is determined if the positioning measurement is to be performed in a second frequency range (e.g., FR2) higher than the first frequency range characterized by typically using beamforming or by a number of beams above a threshold.

In yet another example, if a reference (first) link is associated with a first beamforming configuration, and a second link to be measured for positioning is associated with a second beamforming configuration, then the search window configuration may be determined based on a function of at least the second beamforming configuration or a function of the first and the second beamforming configuration (e.g., based on the widest beam configuration, highest carrier frequency, largest subcarrier spacing (SCS), etc.).

In a further example, a narrower search window may be determined when the expected inter-beam distance between the measured beams is smaller.

In still another example, a smaller expected time difference may be determined between beam1 and beam3 if their coverage areas are closer compared to beam2 and beam4 if their coverage areas are further away (e.g., all four beams may belong to the same cell; beam1 and beam2 may belong to a first cell and beam3 and beam4 may belong to the second cell; any three beams may belong to three different cells while the remaining beam belong to one of the three cells; all four beams may belong to different cells).

Figure 15:
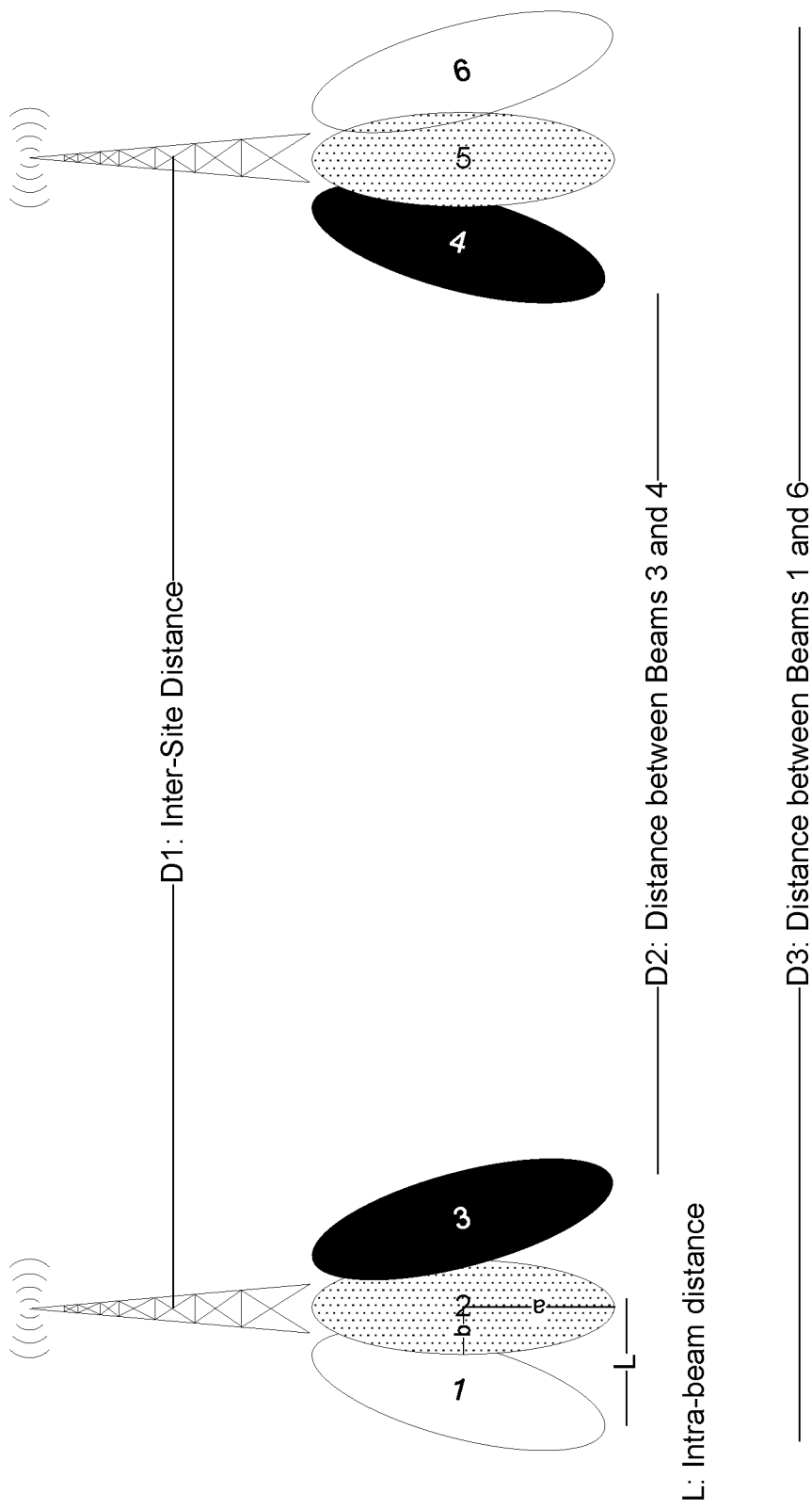
FIG. 15 is a block diagram illustrating determination of search window configuration adaptively to beam configuration according to some embodiments.

Consider an example for determining search window configuration adaptively to beam configuration. FIG. 15 shows different beam coverage may result in different RSTD measurements and uncertainties between different beams of two cells. After the base station transmit beam sweep procedure, it is possible to approximate a UE location based upon a certain beam area (the UE may report measurements based on one or more different beams or may indicate at least best beams seen by the UE). Based upon the number of beams that a base station is transmitting and based upon the intra beam distance L (dependent upon the beam width), it is also possible to approximate the inter-beam distance; especially in the case of D3; distance between Beams 1 and 6 as shown in FIG. 15.

$D3=D1+2L$ $D2=D1-2L$

In one of the embodiments, the inter-beam distance can be computed using the beam geometry (tilt, orientation), as shown in FIG. 16. Here, a and e are beam tilts/orientation. Inter-Beam distance can be computed using the other known parameters, length of beam, inter-site distance and angles using properties such as Rhombus properties.

The computed inter-beam distance can thus be used to determine the Expected RSTD value.

Time=Distance/speed of Light

Thus, if Distance is well calibrated, a better time component such as RSTD can be computed.

An RSTD search window can be provided by considering the UE adjacent beams. If UE is located in Beam 2 of FIG. 16, the expected RSTD search window can be [D1/c, D3/c] and the expected RSTD can be D2/c. The size of the search window may further depend on the maximum expected inter-beam distance, etc. The beams may or may not be on the same carrier frequency and may or may not be transmitted from the same location or the same transmitting point.

As used herein, the term "positioning measurement" may comprise any type of measurement on which a position of a wireless device 12 is based. A positioning measurement may for instance include, e.g. any of: timing-based positioning measurement, TDOA, TOA, RSTD, OTDOA measurement, UE Rx-Tx measurement involving measuring a signal from a neighbor cell, etc.

Herein, the term "reference link" may comprise any link used as a reference for the positioning measurement. For example, the reference link may be e.g. one or more of: serving cell, reference cell (in some examples, may be different from the serving cell), serving beam, best beam, reference beam (in some examples, may be different from the serving or best beam), reference carrier frequency and/or frequency range (e.g., FR1 and FR2), reference bandwidth part, etc. The reference link may also potentially be one of the two links to be used for the positioning measurement, e.g., TDOA will be measurement between the reference link and another link. The reference link may also be the one with respect to which or based on which the search window is to be determined.

Herein, the term "search window configuration" may comprise a configuration of a search window within which the result of the positioning measurement is expected to be. The search window configuration may thereby be the configuration of the window of possible positioning measurement results within which to search for the actual positioning measurement result. The search window configuration may be realized as, e.g., one or more parameters related to: expected measurement value, amount of the expected measurement uncertainty, absolute or relative expected center of the search window, absolute or relative start time of search window, size of the search window (e.g., in Tc units wherein Tc is defined in TS 38.211), size of the half of the search window (e.g., in Tc units), expected RSTD, expected RSTD uncertainty, measurement report mapping table for beam-based RSTD measurements, measurement reporting resolution, and/or the corresponding RSTD range (e.g., minimum and maximum RSTD), etc. So, a "first search window configuration" and a "second search window configuration", unless explicitly stated, can have at least one value of the above parameters different, wherein the values are determined adaptively to corresponding beamforming configurations. For example, different resolution/step size and/or different RSTD measurement report mapping may be used to define the first search window size and the second search window size or the expected RSTD of the first search window configuration and the expected RSTD of the second search window configuration.

Herein, the term "positioning signal" may comprise any type of signal on which a positioning measurement is performed. A positioning signal may include, e.g., any signal or channel to be received by the UE for performing a positioning measurement such as a downlink reference signal, PRS, SSB, synchronization signal, demodulation reference signal (DM-RS), CSI-RS, etc. In some embodiments, a positioning signal is a signal (e.g., PRS) dedicated and/or particularly configured for a positioning measurement. In one example, positioning signal may be configured with a sequence based on signal ID (e.g., PRS ID), resource set, resource within the resource set, periodicity (or can be aperiodic too).

Herein, the term "beamforming" may comprise any of: possibility to transmit a radio signal in different directions without moving the antenna physically, a cell consisting of or comprising multiple beams, transmitting two or more SSBs in a single cell from the same location, using analog beamforming in the transmitting node, using digital beamforming in the transmitting node, using hybrid beamforming in the transmitting node, possibility of transmitting different signals in two or more different directions in the same cell from the same location, transmitting signals from different transmitter branches (comprising one or more antenna elements), or directional transmissions in a mmwave frequency range or FR2 or above 6 GHz. A UE may determine and/or report the number of detected beams, per cell or per carrier. There may also be UE measurement capability in terms the maximum number of beams the UE is expected to be able to handle at the same time. In some cases, a beam may be associated with an SSB ID (on a carrier where SSBs are present) or other signal ID such as DM-RS ID or CSI-RS ID (e.g., on carriers where SSBs are not transmitted but other signals are used to differentiate beams). Furthermore, a positioning signal may be associated with a beam via a TCI configuration or co-location or quasi-colocation (QCL) property with respect to a signal, channel, or CORESET directionally transmitted via a beam, e.g., co-located or quasi-collocated with the corresponding SSB and/or CSI-RS.

Herein, the terms "beamforming configuration" and "beam configuration" may be interchangeably used.

The term "base station" is generically used to denote a network node or transmitting point transmitting radio signals. It can be a base station, gNB, transmission point (TP), transmission reception point (TRP), a transmitter with a distributed antenna system, remote radio head (RRH), positioning beacon, another UE or device transmitting radio signals to be used for positioning by other UEs, a etc. The base station may communicate with other network nodes, e.g., another base station, location server, etc.

The term "location server" is used herein to denote a network node with positioning functionality, e.g., ability to provide assistance data and/or request positioning measurements and/or calculate a location based on positioning measurements. Location server may or may not reside in a base station.

Figure 17:
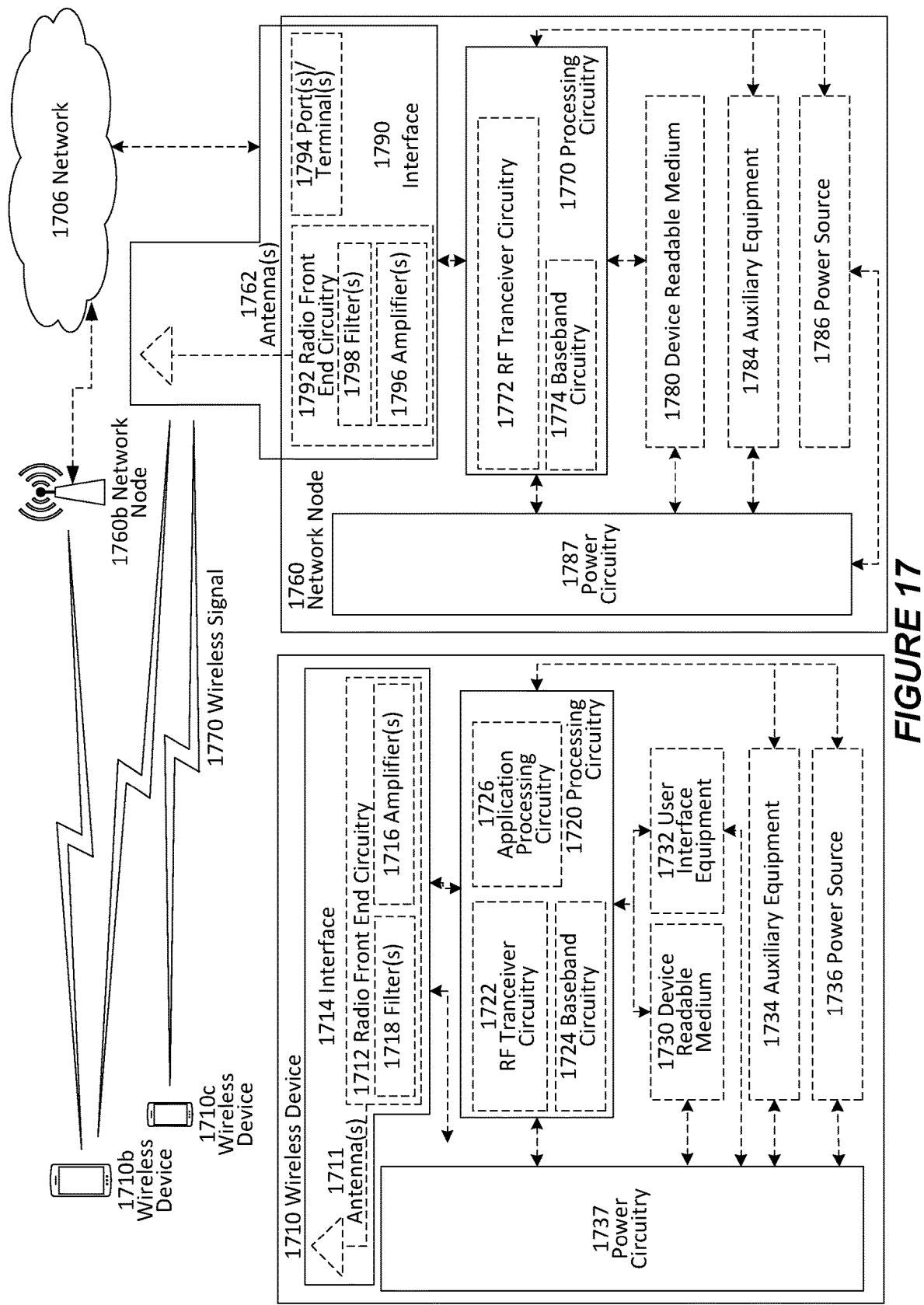
FIG. 17 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760b, and WDs 1710,

1710*b*, and 1710*c*. In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionality may be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry 1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1790 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated.

User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source 1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
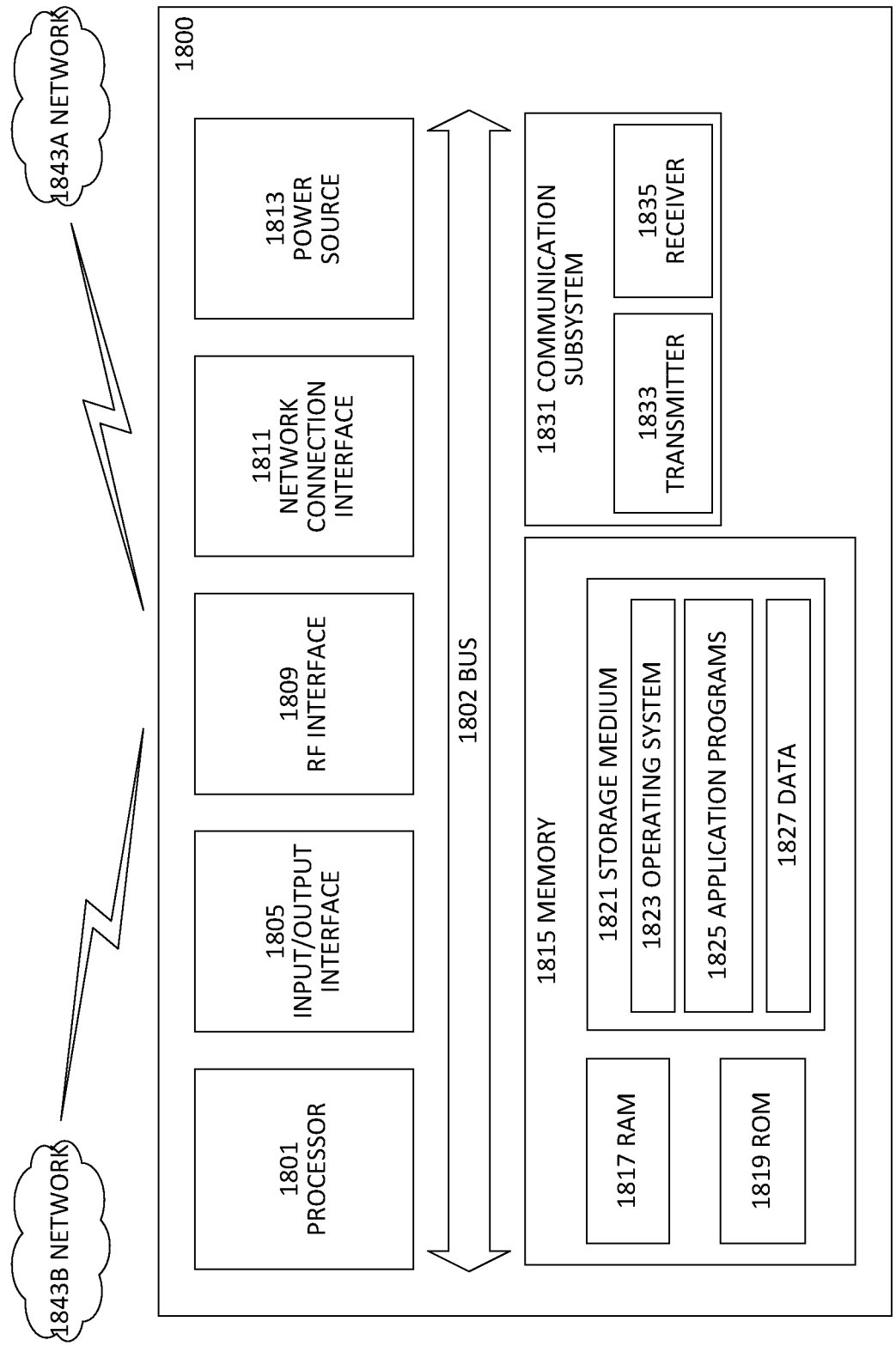
FIG. 18 is a block diagram of a user equipment according to some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 18200 may be any UE identified by the $3^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network 1843*a*. Network 1843*a* may encompass wired and/or wireless networks such as a local-area network (LAN), a wide-area network (WAN), a computer network, a wireless network, a telecommunications network, another like network or any combination thereof. For example, network 1843*a* may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843*b* using communication subsystem 1831. Network 1843*a* and network 1843*b* may be the same network or networks or different network or networks. Communication subsystem 1831 may be configured to include one or more transceivers used to communicate with network 1843*b*. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843*b* may encompass wired and/or wireless networks such as a local-area network (LAN), a wide-area network (WAN), a computer network, a wireless network, a telecommunications network, another like network or any combination thereof. For example, network 1843*b* may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
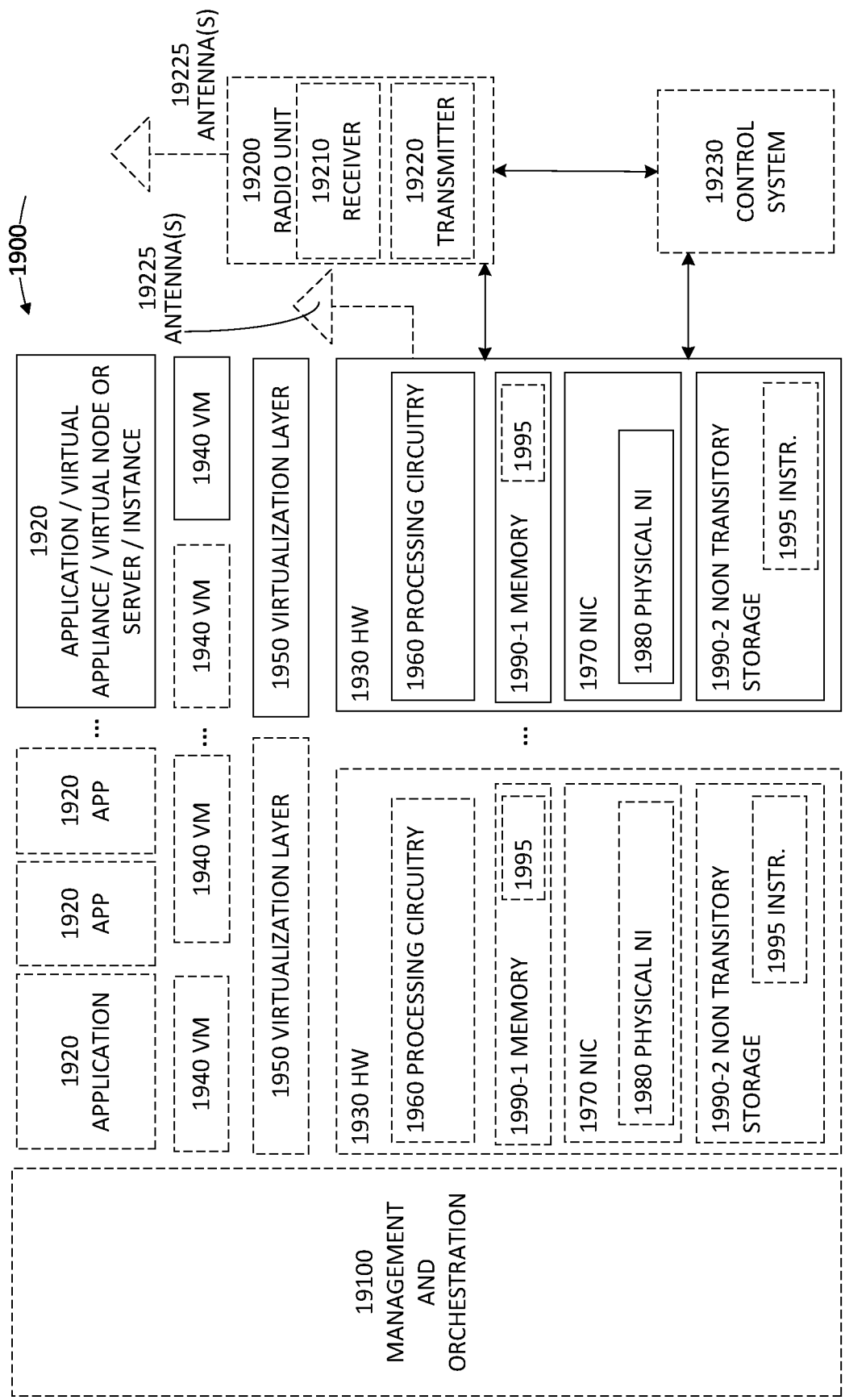
FIG. 19 is a block diagram of a virtualization environment according to some embodiments.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signalling can be effected with the use of control system 19230 which may alternatively be used for communication between the hardware nodes 1930 and radio units 19200.

Figure 20:
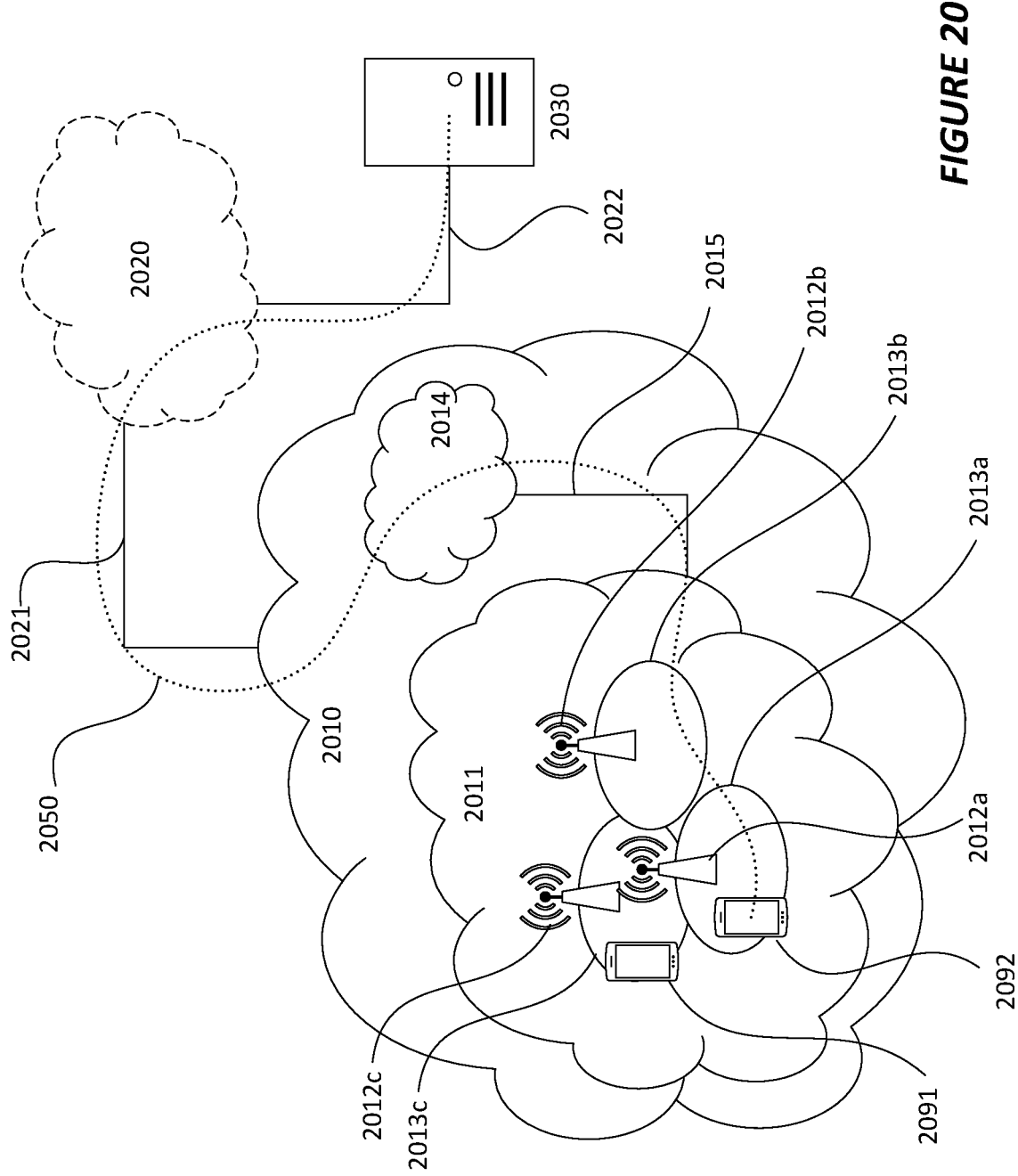
FIG. 20 is a block diagram of a communication network with a host computer according to some embodiments.

FIG. 20 illustrates a telecommunication network connected via an intermediate network to a host computer in accordance with some embodiments. In particular, with reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2091 located in coverage area 2013*c* is configured to wirelessly connect to, or be paged by, the corresponding base station 2012*c*. A second UE 2092 in coverage area 2013*a* is wirelessly connectable to the corresponding base station 2012*a*. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
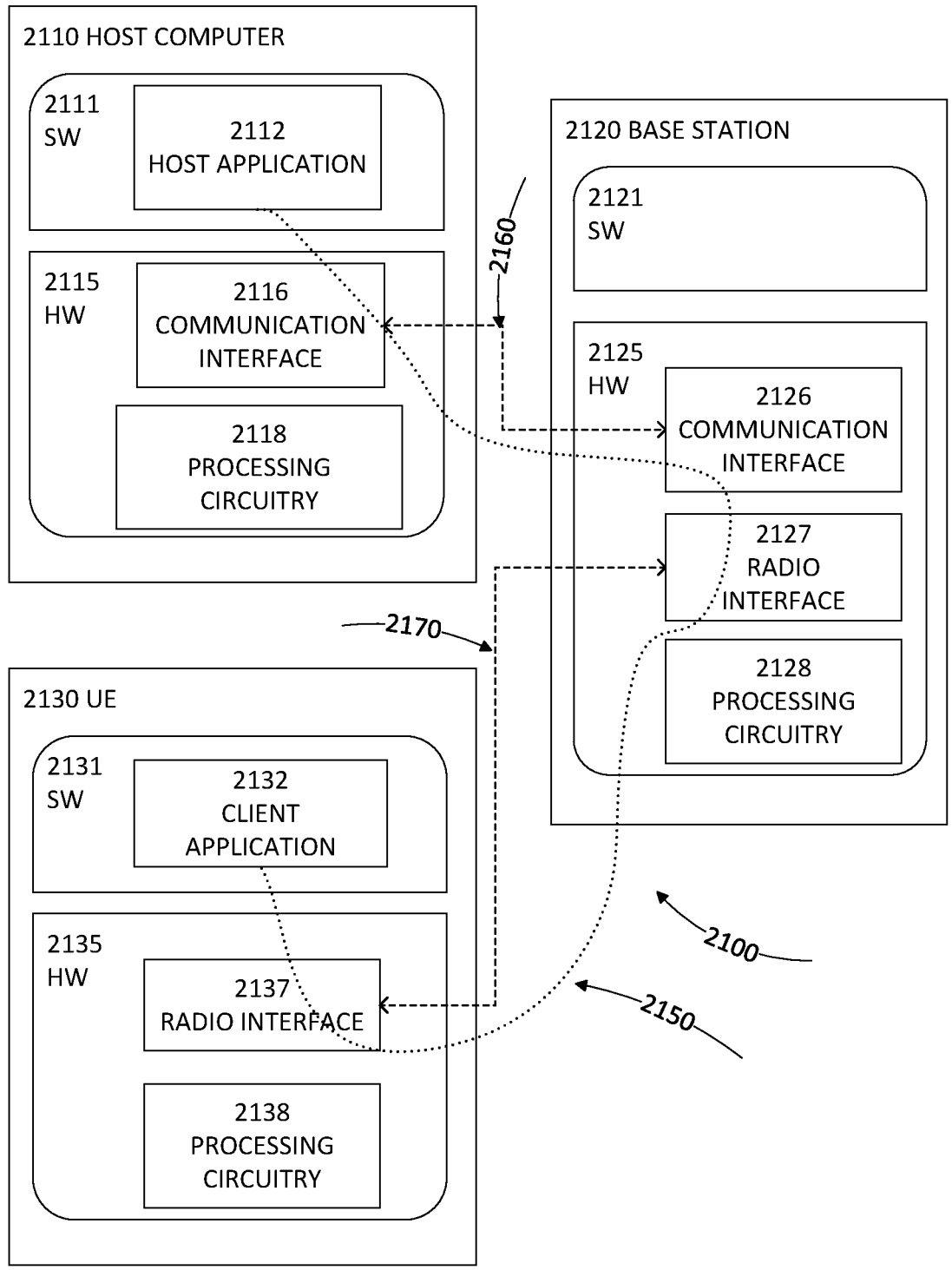
FIG. 21 is a block diagram of a host computer according to some embodiments.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
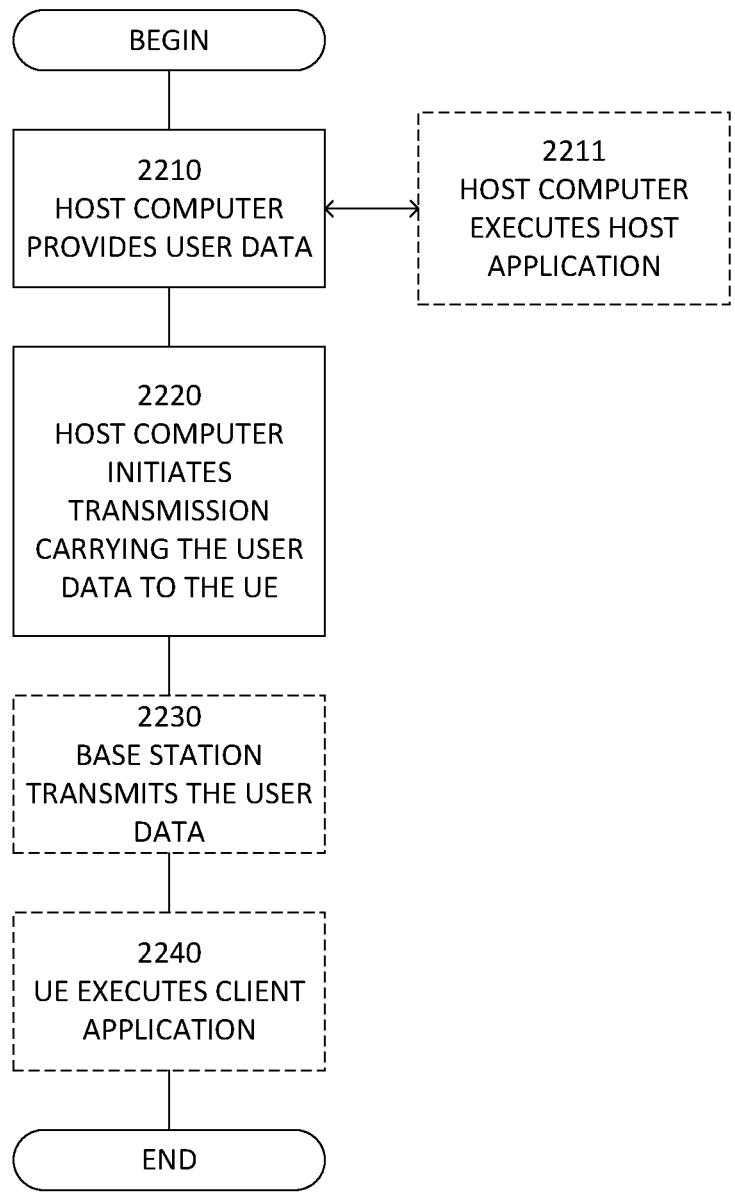
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
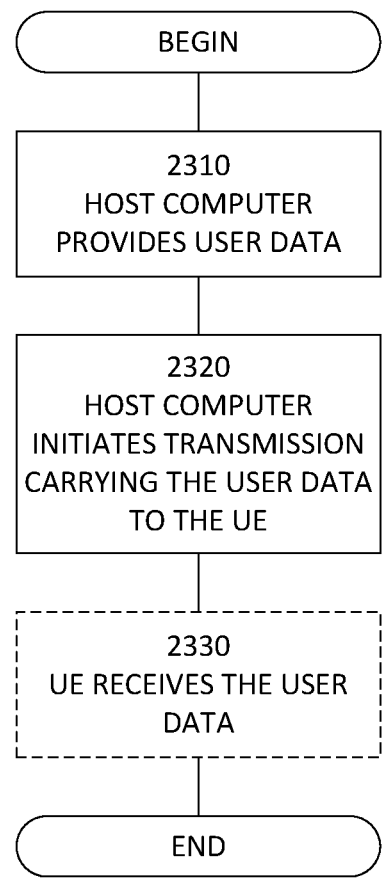
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
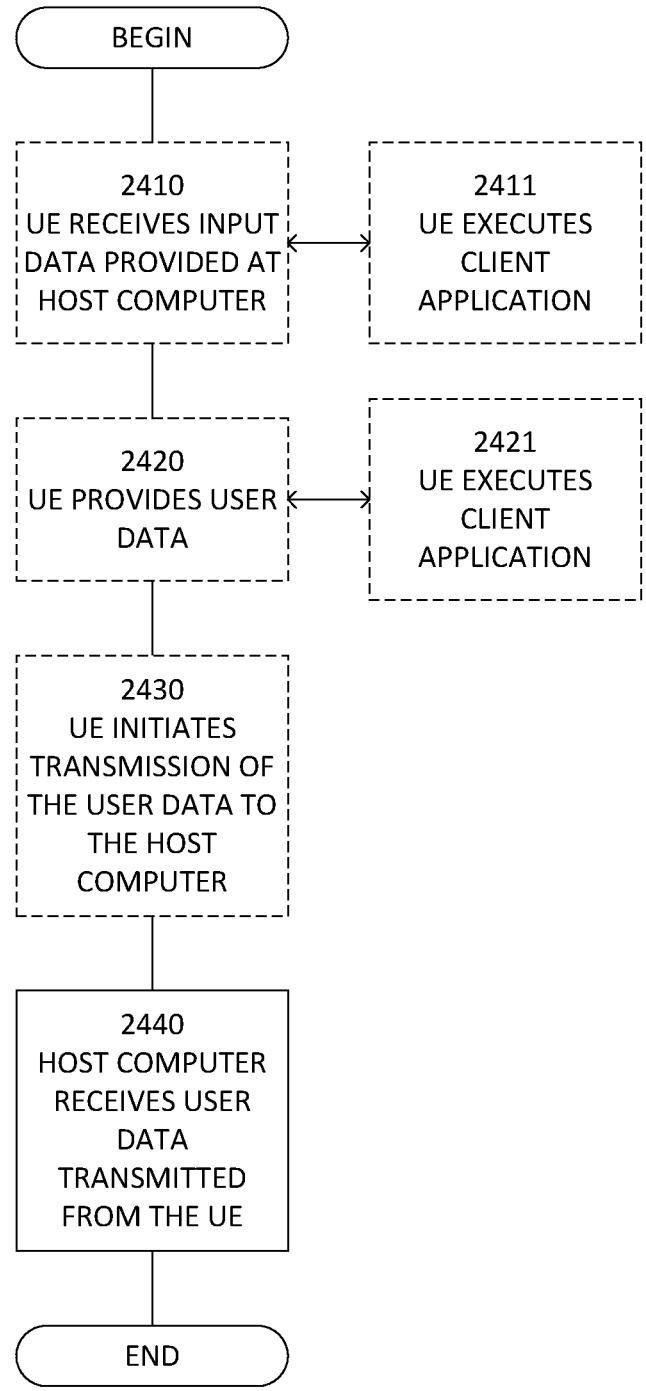
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
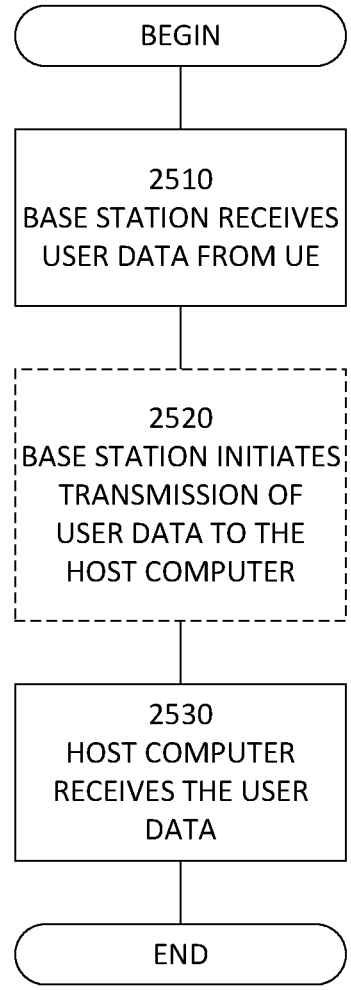
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a network node, the method comprising:

transmitting, from the network node to a wireless device, assistance data that indicates a search window which is associated with a beamforming configuration, wherein the search window associated with the beamforming configuration is a window within which a result of a positioning measurement performed by the wireless device on a positioning signal is expected to be for the associated beamforming configuration.

2. The method of claim 1, wherein the search window is associated with the beamforming configuration via a beam identifier, a synchronization signal block identifier, a transmission configuration indicator, or quasi-colocation characteristics with respect to a signal, channel, or control resource set, where that signal, channel, or control resource set is associated with a beam, positioning reference signal set or resource that is beam-specific.

3. The method of claim 1, further comprising determining the search window to be associated with the beamforming configuration for the positioning measurement, based on that beamforming configuration.

4. The method of claim 3, wherein said determining comprises determining the search window to be associated with the beamforming configuration based on beam information associated with a beam used to transmit the positioning signal, wherein the beam information associated with a beam comprises one or more of:
an identifier of the beam;
an identifier of a synchronization signal block transmitted on the beam;
a quasi-colocation characteristic with respect to a signal, channel, or control resource set associated with the beam;
a positioning signal resource set; or
a resource specific to the beam.

5. The method of claim 3, wherein said determining comprises determining the search window to be a first search window or a second search window, depending respectively on whether, according to the beamforming configuration, beamforming is or is not used to transmit the positioning signal or depending respectively on whether, according to the beamforming configuration, a number of beams used to transmit the positioning signal is or is not below a threshold.

6. The method of claim 3, wherein said determining comprises determining the search window to be a first search window or a second search window:
depending respectively on whether according to the beamforming configuration, a width of one or more beams used to transmit the positioning signal is or is not below a threshold; or
depending respectively on whether the positioning signal is transmitted in a first or a second frequency range, wherein the second frequency range is higher than the first frequency range.

7. The method of claim 3, wherein said determining comprises determining the search window to be a first search window or a second search window that is narrower than the first search window:
depending respectively on whether, according to the beamforming configuration, a maximum inter-beam distance between a beam used to transmit the positioning signal and a beam used to transmit another positioning signal on which the positioning measurement is performed is or is not above a threshold; or
depending respectively on whether, according to the beamforming configuration, coverage areas of a beam used to transmit the positioning signal and a beam used to transmit another positioning signal on which the positioning measurement is performed are or are not farther away than a threshold.

8. A method performed by a wireless device, the method comprising:
receiving, from a network node, assistance data that indicates a search window which is associated with a beamforming configuration, wherein the search window associated with the beamforming configuration is a window within which a result of a positioning measurement performed by the wireless device on a positioning signal is expected to be for the associated beamforming configuration.

9. The method of claim 8, wherein the search window is associated with the beamforming configuration via a beam identifier, a synchronization signal block identifier, a transmission configuration indicator, or quasi-colocation characteristics with respect to a signal, channel, or control resource set, where that signal, channel, or control resource set is associated with a beam, positioning reference signal set or resource that is beam-specific.

10. The method of claim 8, further comprising performing the positioning measurement using the assistance data.

11. The method of claim 10, further comprising:
checking whether a result of the performed positioning measurement falls within the indicated search window; and
deeming the result of the positioning measurement valid or invalid depending respectively on whether or not the result falls within the indicated search window according to said checking.

12. The method of claim 8, wherein the positioning signal is a first positioning signal, wherein the positioning measurement is to be performed by the wireless device on both the first positioning signal and a second positioning signal, and wherein the beamforming configuration is a first beamforming configuration usable to transmit the first positioning signal or a second beamforming configuration usable to transmit the second positioning signal.

13. A network node comprising:
communication circuitry; and
processing circuitry configured to transmit, from the network node to a wireless device, assistance data that indicates a search window which is associated with a beamforming configuration, wherein the search window associated with the beamforming configuration is a window within which a result of a positioning measurement performed by the wireless device on a positioning signal is expected to be for the associated beamforming configuration.

14. The network node of claim 13, wherein the search window is associated with the beamforming configuration via a beam identifier, a synchronization signal block identifier, a transmission configuration indicator, or quasi-colocation characteristics with respect to a signal, channel, or control resource set, where that signal, channel, or control resource set is associated with a beam, positioning reference signal set or resource that is beam-specific.

15. The network node of claim 14, the processing circuitry further configured to determine the search window to be associated with the beamforming configuration for the positioning measurement, based on that beamforming configuration.

16. A wireless device comprising:
communication circuitry; and
processing circuitry configured to receive, from a network node, assistance data that indicates a search window which is associated with a beamforming configuration, wherein the search window associated with the beamforming configuration is a window within which a result of a positioning measurement performed by the wireless device on a positioning signal is expected to be for the associated beamforming configuration.

17. The wireless device of claim 16, wherein the search window is associated with the beamforming configuration via a beam identifier, a synchronization signal block identifier, a transmission configuration indicator, or quasi-colocation characteristics with respect to a signal, channel, or control resource set, where that signal, channel, or control resource set is associated with a beam, positioning reference signal set or resource that is beam-specific.

18. The wireless device of claim 16, the processing circuitry further configured to perform the positioning measurement using the assistance data.

19. The wireless device of claim 18, the processing circuitry further configured to:
   check whether a result of the performed positioning measurement falls within the indicated search window; and
   deem the result of the positioning measurement valid or invalid depending respectively on whether or not the result falls within the indicated search window according to said checking.

20. The wireless device of claim 16, wherein the positioning signal is a first positioning signal, wherein the positioning measurement is to be performed by the wireless device on both the first positioning signal and a second positioning signal, and wherein the beamforming configuration is a first beamforming configuration usable to transmit the first positioning signal or a second beamforming configuration usable to transmit the second positioning signal.

* * * * *